(12) United States Patent
Clarke et al.

(10) Patent No.: US 7,349,123 B2
(45) Date of Patent: Mar. 25, 2008

(54) ALGORITHMS AND METHODS FOR DETERMINING LASER BEAM PROCESS DIRECTION POSITION ERRORS FROM DATA STORED ON A PRINTHEAD

(75) Inventors: Cyrus B. Clarke, Lexington, KY (US); Thomas A. Fields, Winchester, KY (US); Allen P. Johnson, Lexington, KY (US); Christopher D. Jones, Georgetown, KY (US)

(73) Assignee: Lexmark International, Inc., Lexington, KY (US)

( * ) Notice: Subject to any disclaimer, the term of this patent is extended or adjusted under 35 U.S.C. 154(b) by 764 days.

(21) Appl. No.: 10/807,870

(22) Filed: Mar. 24, 2004

(65) Prior Publication Data

US 2005/0212899 A1    Sep. 29, 2005

(51) Int. Cl.
*H04N 1/40* (2006.01)
(52) U.S. Cl. .................................... 358/1.9; 358/504
(58) Field of Classification Search ................ 358/1.9, 358/2.1, 296, 1.7, 504, 406; 347/224–225
See application file for complete search history.

(56) References Cited

U.S. PATENT DOCUMENTS

| | | | |
|---|---|---|---|
| 3,575,505 A | 4/1971 | Parmigiani | |
| 4,233,612 A | 11/1980 | Hirayama et al. | |
| 4,533,959 A | 8/1985 | Sakurai | |
| 4,602,383 A | 7/1986 | Ogawa et al. | |
| 4,630,098 A | 12/1986 | Fling | |
| 4,932,732 A | 6/1990 | Nakajima | |
| 4,953,230 A | 8/1990 | Kurose | |
| 4,975,626 A | 12/1990 | Yagi et al. | |
| 4,975,788 A | 12/1990 | Yamanishi | |
| 5,061,949 A | 10/1991 | Ogino et al. | |
| 5,233,168 A | 8/1993 | Kulik | |
| 5,272,503 A | 12/1993 | LeSueur et al. | |
| 5,491,540 A | 2/1996 | Hirst | |
| 5,517,328 A | 5/1996 | Wilson | |
| 5,517,587 A | 5/1996 | Baker et al. | |
| 5,585,836 A | 12/1996 | Pham et al. | |
| 5,719,680 A | 2/1998 | Yoshida et al. | |
| 5,754,576 A | 5/1998 | Kusano et al. | |
| 5,764,243 A | 6/1998 | Baldwin | |
| 5,926,837 A | 7/1999 | Watanabe et al. | |
| 5,933,184 A | 8/1999 | Ishigami et al. | |
| 6,075,393 A | 6/2000 | Tomita et al. | |
| 6,118,463 A | 9/2000 | Houki et al. | |
| 6,175,375 B1 | 1/2001 | Able et al. | |
| 6,188,801 B1 | 2/2001 | Tsai et al. | |

(Continued)

FOREIGN PATENT DOCUMENTS

JP          59226978 A        12/1984

(Continued)

*Primary Examiner*—Thomas D. Lee
*Assistant Examiner*—Stephen Brinich
(74) *Attorney, Agent, or Firm*—Stevens & Showalter, LLP

(57) ABSTRACT

Systems and methods are provided for characterizing laser beam process direction position errors in an electrophotographic device. Once the process direction position errors of a given beam laser beam system have been characterized, an image is adjusted or warped prior to being processed by the laser beam system to compensate for laser beam process direction position errors, e.g., bow and skew.

19 Claims, 11 Drawing Sheets

U.S. PATENT DOCUMENTS

| | | |
|---|---|---|
| 6,215,511 B1 | 4/2001 | Asako et al. |
| 6,229,555 B1 | 5/2001 | Hadady et al. |
| 6,342,963 B1 | 1/2002 | Yoshino |
| 6,359,640 B1 | 3/2002 | Ravitz et al. |
| 6,363,228 B1 | 3/2002 | Ream |
| 6,408,013 B1 | 6/2002 | Akagi et al. |
| 6,445,404 B1 | 9/2002 | Kerby et al. |
| 6,486,906 B1 | 11/2002 | Foster et al. |
| 6,657,650 B1 | 12/2003 | Omelchenko et al. |
| 6,697,401 B1 | 2/2004 | Schrodinger |
| 6,747,766 B1 | 6/2004 | Kamisuwa et al. |
| 7,079,685 B1 | 7/2006 | Hirota et al. |
| 2002/0130792 A1 | 9/2002 | Schaefer |
| 2005/0212902 A1 | 9/2005 | Cook et al. |

FOREIGN PATENT DOCUMENTS

| | | |
|---|---|---|
| JP | 60007656 A | 1/1985 |
| JP | 60222258 A | 11/1985 |
| JP | 01-241444 | 9/1989 |
| JP | 04-317254 | 11/1992 |
| JP | 08-123900 | 5/1996 |
| JP | 9186853 A | 7/1997 |
| JP | 9265511 A | 10/1997 |
| JP | 2001080124 A | 3/2001 |
| JP | 2002094764 A | 3/2002 |

ALGORITHMS AND METHODS FOR DETERMINING LASER BEAM PROCESS DIRECTION POSITION ERRORS FROM DATA STORED ON A PRINTHEAD

CROSS REFERENCE TO RELATED APPLICATIONS

The present application is related to U.S. Pat. No. 7,206,012, entitled "Memory Device On Optical Scanner And Apparatus And Method For Storing Characterizing Information On The Memory Device"; U.S. Pat. Pub. No. 2005-0212905, entitled "Systems For Performing Laser Beam Linearity Correction And Algorithms And Methods For Generating Linearity Correction Tables From Data Stored In An Optical Scanner"; and U.S. Pat. Pub. No. 2005-0212903, entitled "Electronic Systems And Methods For Reducing Laser Beam Process Direction Position Errors"; each of which is filed currently herewith and hereby incorporated by reference herein.

BACKGROUND OF THE INVENTION

The present invention relates to an electrophotographic imaging apparatus, and more particularly to systems and methods for characterizing laser beam process direction position errors.

In electrophotography, a latent image is created on the surface of an electrostatically charged photoconductive drum by exposing select portions of the drum surface to laser light. Essentially, the density of the electrostatic charge on the surface of the drum is altered in areas exposed to a laser beam relative to those areas unexposed to the laser beam. The latent electrostatic image thus created is developed into a visible image by exposing the surface of the drum to toner, which contains pigment components and thermoplastic components. When so exposed, the toner is attracted to the drum surface in a manner that corresponds to the electrostatic density altered by the laser beam. Subsequently, a print medium such as paper is given an electrostatic charge opposite that of the toner and is pressed against the drum surface. As the medium passes the drum, the toner is pulled onto the surface thereof in a pattern corresponding to the latent image written to the drum surface. The medium then passes through a fuser that applies heat and pressure thereto. The heat causes constituents including the thermoplastic components of the toner to flow into the interstices between the fibers of the medium and the fuser pressure promotes settling of the toner constituents in these voids. As the toner is cooled, it solidifies and adheres the image to the medium.

In order to produce an accurate representation of an image to be printed, it is necessary for the laser to write to the drum in a scan direction, which is defined by a straight line that is perpendicular to the direction of movement of the print media relative to the drum (the process direction). However, a number of optical elements including lenses and mirrors are typically required in the apparatus, including the printhead, to direct the laser beam towards the drum. Unavoidable imprecision in the shape and mounting of these optical elements with respect to the laser beam and/or drum can introduce process direction errors in the path of travel of the laser beam when writing across a scan line. It is also possible that a scan line written to the drum is not perpendicular to the movement of the print media due to laser misalignment and/or media misregistration. Under these conditions, there may be a skew associated with the printed image.

The prior art has attempted to correct for laser beam process direction position errors by incorporating carefully manufactured optics that are precisely aligned. However, the increased precision required by each optical element adds significantly to its cost. Even with precisely manufactured and aligned optics, the degree to which laser beam process direction position errors may be corrected is limited by several factors, including component tolerances. Moreover, distortion of the laser beam optical scan path can occur even in a precisely aligned system due to component aging and/or operational influences such as temperature changes.

SUMMARY OF THE INVENTION

The present invention overcomes the disadvantages of the prior art by providing systems and methods for characterizing laser beam process direction position errors in an electrophotographic device. Once the process direction position errors of a given laser beam have been characterized, bitmap image data may be adjusted or warped based upon the characterization in a manner that generally compensates therefore.

According to an embodiment of the present invention, a table is stored in a memory device for each laser beam of an electrophotographic device. The table stores a plurality of data points that define measurements of the process direction position of the laser beam at several locations along a scan line. A laser scan path model of the laser beam is constructed from the plurality of data points to characterize the laser beam process direction position errors across the scan line.

According to another embodiment of the present invention, a table is stored in a memory device for each laser beam of an electrophotographic device. The table stores a plurality of data points that define measurements of the process direction position of the laser beam at several locations along a scan line. A laser scan path model of the laser beam is constructed from the plurality of data points, and a pel profile is constructed from the laser scan path model. The pel profile is constructed in such a manner that it can be updated to account for changes in scan beam process direction errors due to registration and/or media misalignment corrections entered into the device, such as may be entered during a setup or calibration procedure.

BRIEF DESCRIPTION OF THE SEVERAL VIEWS OF THE DRAWINGS

The following detailed description of the preferred embodiments of the present invention can be best understood when read in conjunction with the following drawings, where like structure is indicated with like reference numerals, and in which.

DETAILED DESCRIPTION OF THE INVENTION

In the following detailed description of the preferred embodiments, reference is made to the accompanying drawings that form a part hereof, and in which is shown by way of illustration, and not by way of limitation, specific preferred embodiments in which the invention may be practiced. It is to be understood that other embodiments may be utilized and that changes may be made without departing from the spirit and scope of the present invention.

General System Overview

Figure 1:
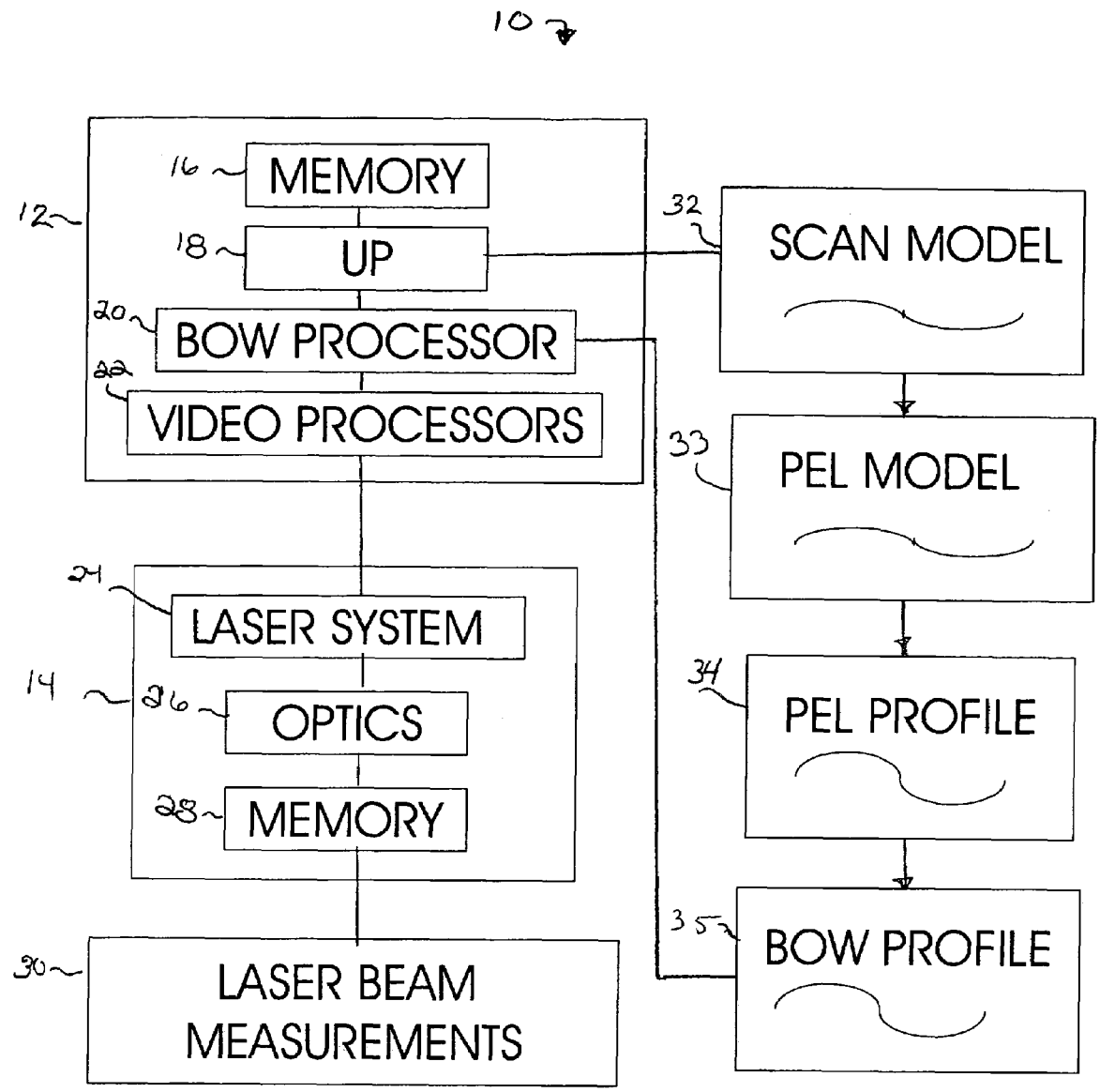
FIG. 1 is a block diagram of a controller for an electrophotographic device according to an embodiment of the present invention.

FIG. 1 illustrates the main components of a system 10 for characterizing and correcting laser beam process direction position errors according to the present invention. The system 10 includes generally, a controller 12 and a printhead 14. The controller 12 includes the electronics and logic necessary for performing electrophotographic imaging including the performance of operations necessary to characterize laser beam process direction position errors as set out in greater detail herein. As shown, the controller 12 includes system memory 16, a microprocessor 18, a bow processor 20 and one or more video processors 22. The printhead 14 includes a laser system 24, an optical system 26 and a memory device 28. If implemented in a color device, the system 10 may include four video processors 22, one video processor 22 for each of the cyan, yellow, magenta and black (CYMK) image planes. Each video processor 22 may have associated therewith, a corresponding laser in the laser system 24 of the printhead 14.

Prior to initiating a printing operation, the microprocessor 18 reads a plurality of laser beam position measurements 30 from the memory device 28 on the printhead 14 and derives therefrom, a laser beam scan path model 32 for each laser beam in the laser system 24. Each laser beam scan path model 32 generally describes or models the scan path of the corresponding laser beam as it moves across a corresponding photoconductive drum. The microprocessor 18 then converts each laser beam scan path model 32 into a corresponding Pel model 33 that represents the associated laser beam scan path data in terms of Pel locations and process direction offsets. Each Pel model 33 is expanded into a Pel profile 34 that characterizes process direction position offsets for each Pel location along an associated laser beam scan path. Each Pel profile 34 is then used to derive a corresponding bow profile 35. The bow profile 35 includes a representation of the data in the Pel profile 34 in a format suitable for processing by the bow processor 20.

Basically, the process direction position offset of each Pel location defines a measure of laser beam error that if uncorrected, would result in distortion in the output of an image written by the corresponding laser beam. Process direction position errors of the lasers in the laser system 24 include, for example, bowed and/or skewed scan lines formed on a corresponding photoconductive drum and can be caused by a number of factors including unavoidable imprecision in the shape and mounting of components in the optical system 26, laser misalignment and/or media misregistration.

Briefly, an image to be printed is temporarily stored in the system memory 16. For color printing, the image is deconstructed into four bitmaps corresponding to the cyan, yellow, magenta and black (CYMK) image planes. The microprocessor 18 then initiates a printing operation whereby each color image plane bitmap is communicated to the bow processor 20. The bow processor 20 pre-warps the bitmap image data according to the associated bow profile 35 before the image data is converted into an appropriate video signal by the corresponding video processor 22. The bow profile 35 essentially instructs the bow processor 20 how to warp the image data in a manner that generally compensates for the process direction position errors of written Pels inherent in the corresponding laser beam scan path, which reduces the distortion evident in the output image. The pre-warped image data may be stored in an appropriate memory location, such as in the system memory 16, before being communicated to the associated video processor 22, which converts the pre-warped image data into a video signal suitable for writing by the corresponding laser in the printhead 14.

Factors affecting process direction position errors are discussed in greater detail in U.S. Pat. Pub. No. 2005-0212903, entitled "Electronic Systems And Methods For Reducing Laser Beam Process Direction Position Errors", which is already incorporated by reference herein. For example, the bow processor 20 discussed herein corresponds to the bow system and corresponding bow processor discussed therein. Likewise, the algorithms and methods for determining laser beam process direction position errors, which are set out in the present application, may be applied to U.S. Pat. Pub. No. 2005-0212903. For example, the bow profile 35 herein corresponds to the bow profile disclosed in that application.

Laser Beam Scan Path Test Points

Figure 2:
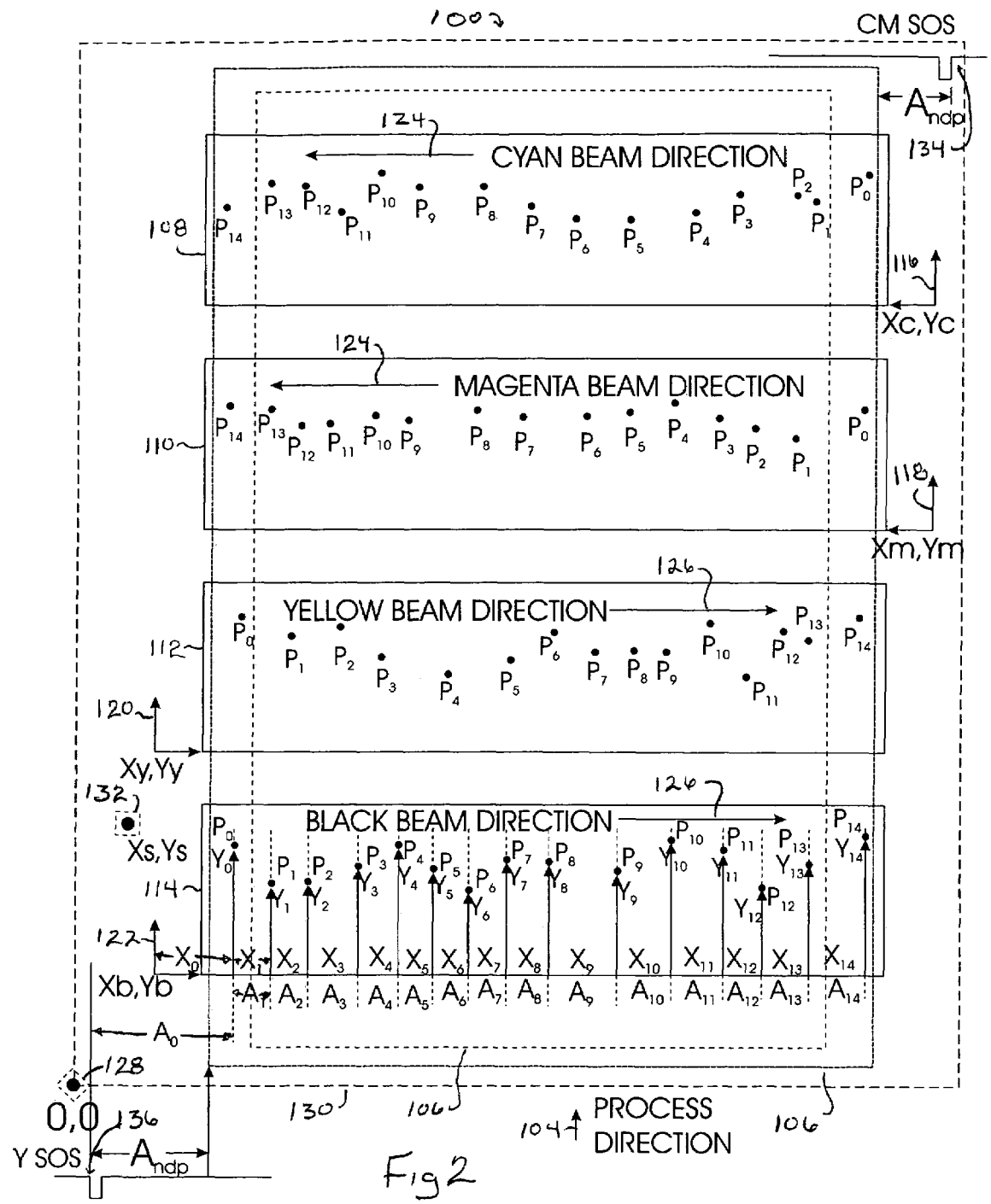
FIG. 2 is a schematic view of a laser scanning system from the perspective of a printhead looking onto a print medium.

In order to ultimately derive the bow profile 35, the microprocessor 18 first determines a measure of the process direction position errors for each laser beam based upon the laser beam measurements 30, which are stored on a memory device 28 of the printhead 14. Referring to FIG. 2, a schematic representation of a laser scanning system 100 is illustrated from the perspective of the printhead 14 looking onto a print medium. Typically, each laser beam of the printhead 14 writes to a corresponding photoconductive drum. However, for purposes of clarifying the principles of the current embodiment of the present invention, FIG. 2 assumes that each laser writes directly to a print medium (indicated by the dashed box 102) instead of its corresponding photoconductive drum. The print medium 102 is assumed to move up the page in a process direction, as illustrated by the directional arrow 104. Notably, the width of the print medium 102, e.g., a typical sheet of letter-sized paper, is less than the maximum writeable area of the corresponding laser beams as indicated by the dashed box 106.

The ideal scan path for each laser beam is a straight line scan path that is transverse to the process direction 104, thus across the page as shown. However, each laser beam is likely to exhibit process direction position errors. In FIG. 2, most of the illustrated errors are generally bow like in shape. However, it is contemplated that a scan line path can be skewed as well. As such, the scan path for each laser beam is encompassed by a scan plane as illustrated, which represents an area bounding each laser beam scan path. That is, a cyan scan plane 108 represents an area that bounds the scan path of the cyan laser beam. A magenta scan plane 110 represents an area that bounds the scan path of the magenta laser beam. A yellow scan plane 112 represents an area that bounds the scan path of the yellow laser beam. And correspondingly, a black scan plane 114 represents an area that bounds the scan path of the black laser beam.

To frame the laser beam position measurements into a meaningful context for processing, each scan plane 108, 110, 112, 114 is associated with a corresponding local beam position origin 116, 118, 120, 122. As shown, a cyan beam position origin 116 is arbitrarily positioned with respect to the cyan scan plane 108. A magenta beam position origin 118 is arbitrarily positioned with respect to the magenta scan plane 110. A yellow beam position origin 120 is positioned with respect to the yellow scan plane 112, and correspondingly, a black position origin 122 is arbitrarily positioned with respect to the black scan plane 114.

The beam position origins 116, 118, 120, 122 are provided for convenience and allow scan path measurements taken in each corresponding scan plane 108, 110, 112, 114 to be referenced relative to a local coordinate system. It may be convenient to select a position for each of the beam position origins 116, 118, 120, 122 in a manner that minimizes or eliminates the need to store and manipulate negative numbers. For example, by selecting the beam position origin 116, 118, 120, 122 to be located before the first test point measured relative to the scan direction, i.e., the direction of travel of the corresponding laser beam, all of the scan direction measurements (X-axis measurements) will be positive. Correspondingly, by setting the beam position origin 116, 118, 120, 122 at or below the lowest expected test point with respect to the process direction 104 of a given scan plane 108, 110, 112, 114, process direction measurements (Y-axis measurements) will be positive. As shown, the process direction 104 is the same for all of the scan planes 108, 110, 112, 114. However, the cyan and magenta laser beams traverse generally in a first scan direction 124, illustrated as traversing across the page from the right to the left. The yellow and black laser beams traverse generally in a second scan direction 126, which is generally opposite of the first scan direction 124 as is illustrated traversing across the page from the left to the right.

Figure 3:
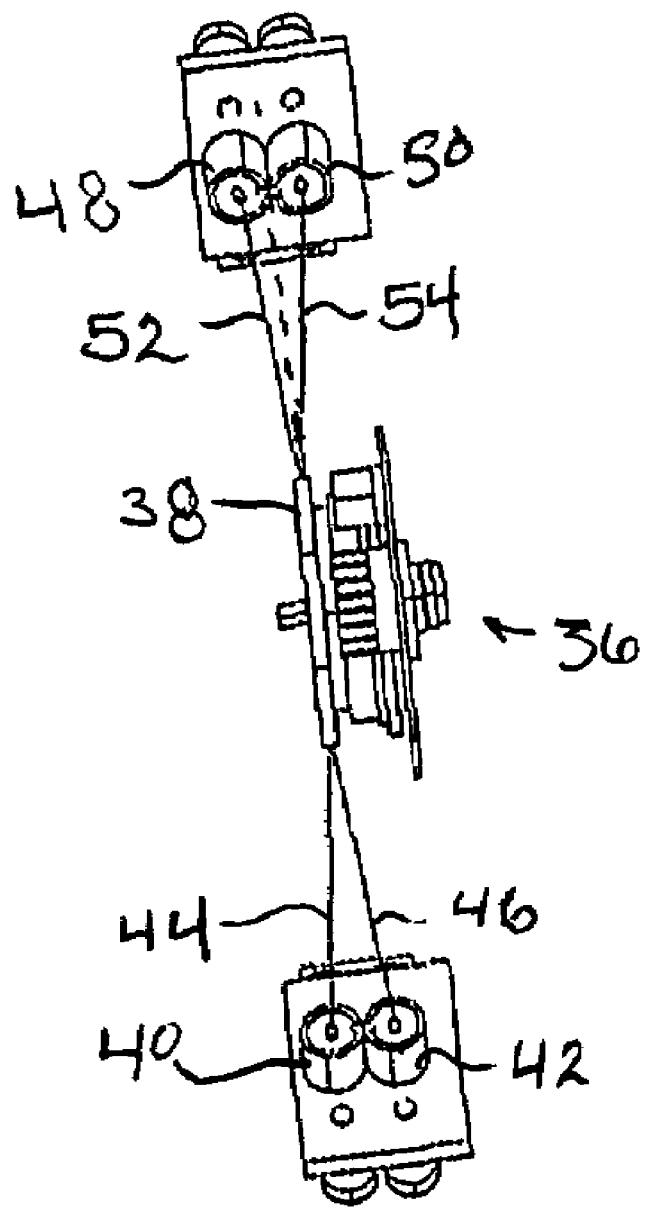
FIG. 3 is a schematic representation of the relationship between the four lasers in the printhead, and the rotating polygonal mirror.

These scan direction orientations correspond to the manner in which the corresponding laser beam impinges the rotating polygon mirror as illustrated in FIG. 3. Referring thereto, a rotating polygonal mirror 36 in the optical system 26 includes a plurality of facets 38 thereon, and is operatively configured to rotate at a fixed rotational velocity. The laser system 24 includes a first laser 40 and a second laser 42 that are positioned in proximity to one another. Each of the first and second lasers 40, 42 emits a corresponding laser beam 44, 46 so as to impinge upon the same one of the facets 38 of the polygonal mirror 36. The laser system 24 also includes a third laser 48 and a fourth laser 50 that are positioned in proximity to one another and in spaced relation to the first and second lasers 40, 42. Each of the third and fourth lasers 48, 50 emits a corresponding laser beam 52, 54 so as to impinge upon the same one of the facets 38 of the polygonal mirror 36, which is different from the facet 38 impinged by the first and second beams 44, 46. As the polygonal mirror 36 rotates, the angle of each laser beam 44, 46, 52, 54 with respect to a particular facet 38 impinged thereby changes causing each laser beam 44, 46, 52, 54 to sweep in a corresponding scan plane in the direction of rotation of the polygonal mirror 36. Accordingly, it can be observed that the first and second laser beams 44, 46 will sweep in a scan direction that is generally opposite of the scan direction of the third and fourth beams 52, 54. Due to the unavoidable imprecision in the shape and mounting of the polygonal mirror 36 and optical system 26 with respect to each laser beam 44, 46, 52, 54, process direction errors including bow and skew are introduced into the image output.

Referring back to FIG. 2, a plurality of test points, e.g., fifteen test points, labeled $P_0$-$P_{14}$ as shown, are detected and recorded at various locations across each scan plane 108, 110, 112, 114. The laser beam position measurements 30 stored on the memory device 28 in the printhead 14 correspond to measurements taken at these test points $P_0$-$P_{14}$ for each scan plane 108, 110, 112, 114. The number of test points and the interval(s) upon which the test points are taken can vary. For example, the number of measurements corresponding to each test point may be dependent upon the available system resources (e.g., the amount of memory allocated to store the test point data on the memory device 28 of the printhead 14 may be limited), or a desired level of precision for which the process direction position errors of written Pels are to be characterized.

For purposes of clarity, the remainder of the discussion herein will be directed primarily towards a discussion of the black scan plane 114. However, the discussion applies equally as well to the cyan, magenta and yellow scan planes 108, 110, 112 with notable differences identified.

The laser beam corresponding to the bitmap pixel data for the black image plane traverses in the second scan direction 126 across the page from the left to the right as illustrated. For convenience, the fifteen test points are correspondingly labeled, with test point $P_0$ being the leftmost test point and $P_{14}$ being the rightmost test point. The test points $P_0$-$P_{14}$ represent measurements recorded of the actual laser beam position as the laser swept across the scan plane 114. It should be noted that the algorithms and systems according to the current embodiment of the present invention do not physically alter the scan path of each laser beam. Rather, by characterizing the process direction position errors of a laser beam, corresponding image data can be electronically warped or distorted in a manner such that during printing, the inherent process direction position errors of the laser "un-warp" the electronically warped image data such that corresponding Pels are printed with little or no process direction position errors, i.e., each written line of Pels is substantially straight and transverse to the process direction 104.

The measurements for the test point $P_0$ are expressed as Cartesian X, Y coordinates, where $X_0$ represents the distance that test point $P_0$ lies from the black beam position origin 122 in the scan direction 126 and $Y_0$ represents the distance that test point $P_0$ lies from the black beam position origin 122 in the process direction 104. Any suitable unit of measure, e.g., microns, millimeters, etc. may be used to record the measurement. The scan direction (X-axis) measurements for the remainder of the test points $P_1$-$P_{14}$, are taken relative to the preceding test point. For example, the measurement recorded for test point $P_1$ in the scan direction 126 is distance in the scan direction 126 that test point $P_1$ lies from test point $P_0$, etc. This approach allows the size of each measurement to be kept relatively small, and reduces the amount of space necessary to store the measurements in a memory device. Alternatively, each test points $P_1$-$P_{14}$ may be expressed relative to the black beam position origin 122.

The beam position measurements for each of the scan planes 108, 110, 112, 114 may be taken at some time during manufacturing of the apparatus and are stored in the memory device 28 or some other memory device accessible to the controller 12. An exemplary approach to measuring points along a laser beam scan path is set out in U.S. Pat. No. 7,206,012, entitled "Memory Device On Optical Scanner And Apparatus And Method For Storing Characterizing Information On The Memory Device" to the same assignee, the contents of which are already incorporated by reference herein.

It may be desirable to describe the location of each of the beam position origins with respect to an arbitrary image system origin 128. As shown, an image system plane 130 (illustrated by the dashed box) encompasses each of the cyan, magenta, yellow and black scan planes 108, 110, 112, 114. The image system plane 130 thus defines a global coordinate system relative to each of the local coordinate systems for each corresponding scan plane 108, 110, 112, 114. The image system origin 128 thus allows each test point $P_0$-$P_{14}$ of each scan plane 108, 110, 112, 114 to be described in a global coordinate system.

Again, the location of the image system origin 128 can be completely arbitrary. However, it may be convenient to select the location of the image system origin 128 to eliminate the need to process negative numbers. As shown, for convenience the image system origin 128 is located in the lower left hand corner, and is designated with a global address of (0,0). Relative to the image system origin 128, the scan direction is designated along the X-axis (across the page), with positive values to the right thereof. The process direction is designated along the Y-axis, with positive values above the image system origin 128. The coordinates of the cyan beam position origin 116 with respect to the image system origin 128 is Xc, Yc. The coordinates of the magenta beam position origin 118 with respect to the image system origin 128 is Xm, Ym. Similarly, the coordinates of the yellow beam position origin 120 with respect to the image system origin 128 is Xy, Yy, and the coordinates of the black beam position origin 122 with respect to the image system origin 128 is Xb, Yb.

A correlation is also established between the printhead 14 and each of the scan planes 108, 110, 112, 114 by defining a printhead origin, i.e., a known, fixed point arbitrarily selected in the printhead. For convenience, the printhead datum is selected, however, any other position may alternatively be used. As shown, the printhead datum is projected down onto the page to define a printhead origin 132, which is located at coordinates Xs, Ys with respect to the image system origin 128. Based upon the above, it can be seen that the beam position measurements (test points $P_0$-$P_{14}$) from each of the scan planes 116, 118, 120, 122 can now be freely mapped between their respective local coordinate systems, to a system based relative to the printhead.

Characterizing a Laser Beam

The Laser Beam Scan Path Model

Based upon the process and scan direction beam position measurements (X, Y) of the test points $P_0$-$P_{14}$ for a given scan plane 108, 110, 112, 114, it is possible to construct a corresponding laser beam scan path model 32 that characterizes the scan path of the corresponding laser beam. Essentially, the number of test points taken should be sufficient to allow each laser beam scan path to be approximated to a desired level of precision. However, knowledge of the laser beam scan path alone is not always sufficient to be able to correspond a particular Pel in a bitmap image to be printed, to a position along the scan path. This is because the location of a written Pel along a scan path will be affected by a number of factors including printer registration data and laser beam scanning velocity (which may change as the laser beam sweeps across its scan plane). Accordingly, information in addition to the X, Y coordinates may be necessary to properly characterize the process direction position errors of written Pels.

The Pel Model and the Pel Profile

In order to correspond the location of written Pels to particular positions along the scan path of a given laser beam, the laser beam scan path model 32 is converted into a Pel model 33 and corresponding Pel profile 34. The Pel model 33 maps the location of each test point $P_0$-$P_{14}$ to a Pel location and process direction offset. Correspondingly, the Pel profile 34 is essentially the Pel model 33 expanded out to include a mapping for each Pel location across a printed page.

An exemplary approach to correspond a test point location $P_0$-$P_{14}$ to a particular written Pel location is to measure the position of each of the above described test points $P_0$-$P_{14}$ as a function of the angular position of the rotating polygonal mirror. A single start-of-scan signal 134 is provided for the laser beams corresponding to the cyan and magenta scan planes 108, 110, which is designated herein as CM SOS. Correspondingly, a single start-of-scan signal 136 is provided for the laser beams corresponding to the yellow and black scan planes 112, 114, which is designated herein as KY SOS. The start-of-scan is indicated schematically as the negative going edge of the corresponding signal.

Again, with reference to the black scan plane 114, a predetermined amount of time after detecting the start of scan signal 136, a nominal detect to print signal (which is optionally modified by registration calibration data) indicates that the laser corresponding to the black scan plane 114 has reached the location where it can write the first Pel, designated Pel 0 (not shown in FIG. 2). It should be noted that the location of Pel 0 is a function of the time since detecting the start of scan signal 136 (DetTo Print$_{(time)}$), and the angular velocity of the rotating polygonal mirror ($\omega_{polygonalmirror}$). Accordingly, it may be convenient to store the nominal detect to print value as an angle measurement with respect to a known, fixed point, e.g., a start of scan sensor:

$$A_{ndp} \text{ (degrees)} = \omega_{polygonalmirror} \frac{(rev)}{(min)} \times DetToPrint_{(time)} \text{ (sec)} \times \frac{360 \text{ (degrees)}}{(rev)} \times \frac{1 \text{ (min)}}{60 \text{ (sec)}}$$

Such an approach normalizes the measurement and eliminates its dependency upon a potentially varying rotational velocity of the rotating polygonal mirror. In a similar fashion, an angle $A_0$ is measured, which corresponds to an angular change of the rotating polygonal mirror with respect to the staff-of-scan signal 136 as the laser beam corresponding to the black scan plane 114 crosses the first test point $P_0$. The angles $A_1$-$A_{14}$ are similarly measured, but are recorded relative to the preceding measurement as delta mirror angles to reduce storage requirements. That is, $A_1$ is the change in the angle of the rotating polygonal mirror since $A_0$, etc. The angles discussed herein may be measured as is set out in U.S. Pat. No. 7,206,012, entitled "Memory Device On Optical Scanner And Apparatus And Method For Storing Characterizing Information On The Memory Device" to the same assignee, the contents of which are already incorporated by reference herein.

It should be noted that the first beam position measurement, e.g., test point $P_0$, does not necessarily correspond to the Pel 0 location, i.e., the location where the first Pel that fits onto a physical page. Similarly, the last beam position measurement, e.g., test point $P_{14}$, does not necessarily need to correspond to the last Pel that can be written to a particular print medium, i.e., the last Pel that can be written to a physical page along a scan line. Rather, the beam position measurements 30 (such as the test points $P_0$-$P_{14}$ for each scan plane 108, 110, 112, 114) can be taken anywhere along the laser beam scan path and should be selected so as to characterize the scan path for each scan plane to the desired level of precision required for a particular application. For example, it may be desirable to intentionally locate select ones of the beam position measurements outside the boundaries of the typical expected printed page.

Beam Position Measurement Data

Some of the data used to compute a bow profile 35 for each laser beam scan path is recorded in one or more tables in the memory device 28 on the printhead 14. Table 1, below, is merely illustrative of the manner in which those beam position measurements 30 may be stored. As can be seen in the table below, each color image plane 108, 110, 112, 114 includes entries that identify the coordinates of the corresponding local beam position origin 116, 118, 120, 122 relative to the image system origin 128 and corresponding beam position measurements (X, Y and A for each corresponding test point $P_0$-$P_{14}$). The scan direction (X-axis) measurements for each of the test points $P_0$-$P_{14}$ for each color scan plane 108, 110, 112, 114 are encoded into two byte values, and the fifteen corresponding X-axis values for each scan plane 108, 110, 112, 114 are concatenated into a single, 30 byte vector. The encoding for the scan direction (X-axis) measurements is applied likewise to the process direction (Y-axis) measurements and the Angle measurements. The table also stores the rotating polygonal mirror angular position $A_{ndp}$ corresponding to the nominal detect to print signal for each scan plane, the printhead origin coordinates as an offset from the image system origin 128, and the time period between the start of scan (CM SOS and KY SOS) and end of scan (EOS) signals.

TABLE 1

Printhead Memory Allocation Table

| Name | Units | Size | Description |
|---|---|---|---|
| Xc | microns | 4 | X Offset from image system origin to cyan coordinate system |
| Yc | microns | 4 | Y Offset from image system origin to cyan coordinate system |
| Cyan X Vector | microns | 30 | Delta X vector for cyan with respect to (wrt) cyan beam position origin. |
| Cyan Y Vector | microns | 30 | Y vector for cyan wrt cyan beam position origin. |
| Cyan A Vector | Δ degrees | 30 | Delta angle vector for cyan wrt to SOS. |
| Cyan Nominal DetPrt | Δ degrees | 2 | Nominal DetPrt wrt to SOS in degrees* 8192 |
| Xm | microns | 4 | X Offset from image system origin to magenta coordinate system |
| Ym | microns | 4 | Y Offset from image system origin to magenta coordinate system |
| Magenta X Vector | microns | 30 | Delta X vector for magenta wrt magenta beam position origin |
| Magenta Y Vector | microns | 30 | Y vector for magenta wrt magenta beam position origin. |
| Magenta A Vector | Δ degrees | 30 | Delta angle vector for magenta wrt to SOS. |
| Magenta Nominal DetPrt | Δ degrees | 2 | Nominal DetPrt wrt to SOS in degrees* 8192 |
| Xy | microns | 4 | X Offset from image system origin to yellow coordinate system |
| Yy | microns | 4 | Y Offset from image system origin to yellow coordinate system |
| Yellow X Vector | microns | 30 | Delta X vector for yellow wrt yellow beam position origin. |
| Yellow Y Vector | microns | 30 | Y vector for yellow wrt yellow beam position origin. |
| Yellow A Vector | Δ degrees | 30 | Delta angle vector for yellow wrt to SOS. |
| Yellow Nominal DetPrt | Δ degrees | 2 | Nominal DetPrt wrt to SOS in degrees* 8192 |
| Xb | microns | 4 | X Offset from image system origin to black coordinate system |
| Yb | microns | 4 | from image system origin to black coordinate system |
| Black X Vector | microns | 30 | Delta X vector for black wrt black beam position origin |
| Black Y Vector | microns | 30 | Y vector for black wrt black beam position origin. |
| Black A Vector | Δ degrees | 30 | Delta angle vector for black wrt to SOS. |
| Black Nominal DetPrt | Δ degrees | 2 | Nominal DetPrt wrt to SOS in degrees*8192 |
| Xs | uM | 2 | Printhead origin offset from Image System origin |
| Ys | uM | 2 | Printhead origin offset from Image System origin |
| CM SOS to EOS | ns | 4 | Cyan/Magenta SOS to EOS |
| KY SOS to EOS | ns | 4 | Black/Yellow SOS to EOS |

Building the Profiles in Memory

Figure 4:
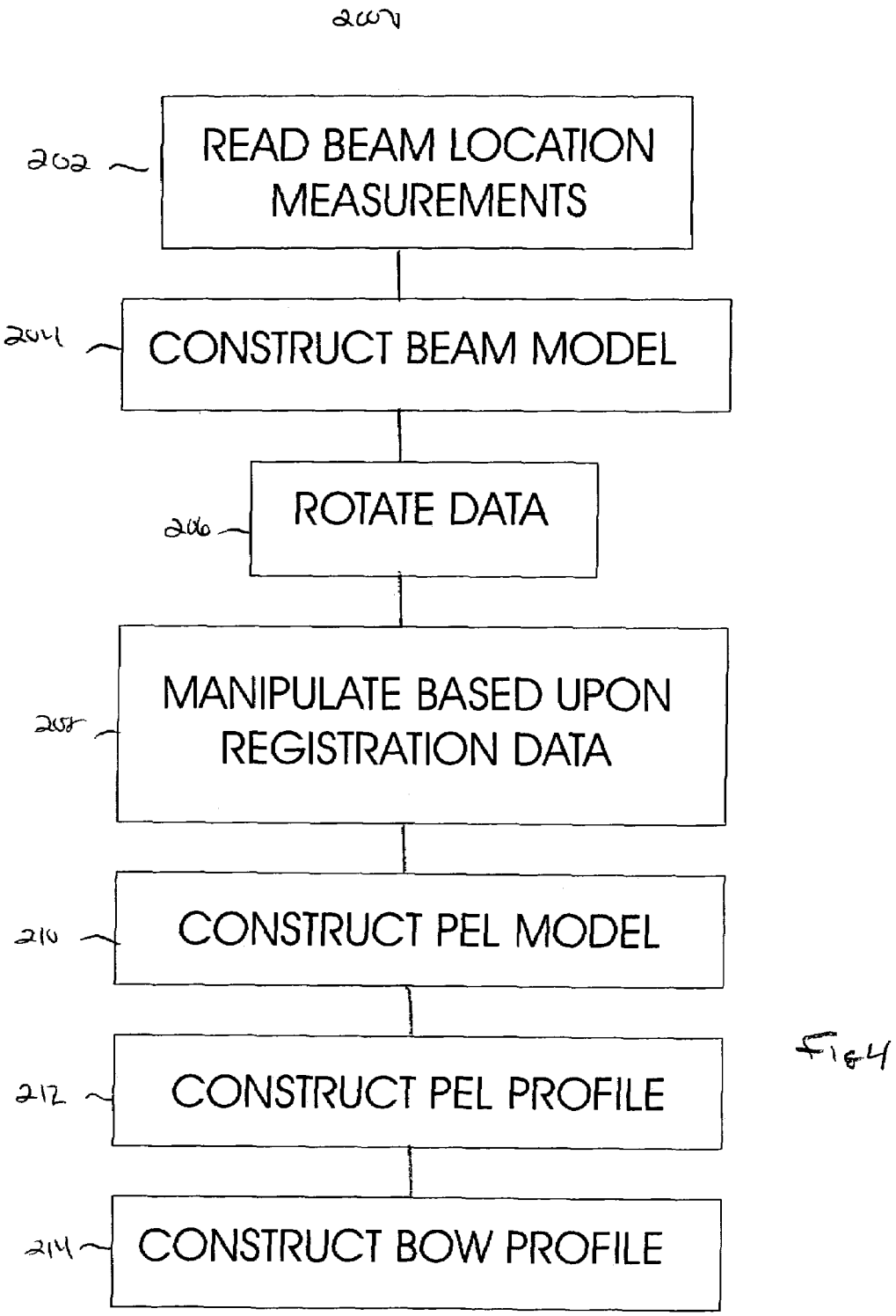
FIG. 4 is a flow chart for creating a bow profile that characterizes process direction position errors of a corresponding laser beam as it traverses across its scan path.

Referring to FIG. 4, a flow chart illustrates a method 200 for constructing a bow profile from laser beam position measurements. The method may be implemented for example, by software instructions executed on the microprocessor 18 in the controller 12 and may be repeated for each color scan plane 108, 110, 112, 114. Initially and in the illustrated embodiment, the corresponding beam position measurements are read from the printhead memory device 28 at 202. A corresponding laser beam scan path model 32 is constructed from the laser beam position measurements 30 at 204. At this stage, each laser beam scan path model 32 may comprise a set of X-Y coordinates for a plurality of test points with respect to the printhead origin 132 (e.g., the printhead datum) and corresponding angle measurements that define the rotating polygonal mirror angle for each of the test points. Next, the laser beam scan path model 32 is rotated at 206, and optionally, manipulated, e.g., magnified, scaled and/or skew adjusted, based on the registration or calibration inputs at 208. The rotated and manipulated laser beam scan path model 32 is then converted into a Pel model 33 at 210. The Pel model 33 is converted into a Pel profile 34 at 212. The Pel profile 34 is then converted into a bow profile 35 at 214. The rotation, manipulation and conversion of the model are explained in greater detail below.

Creating a Laser Beam Scan Path Model

Figure 5:
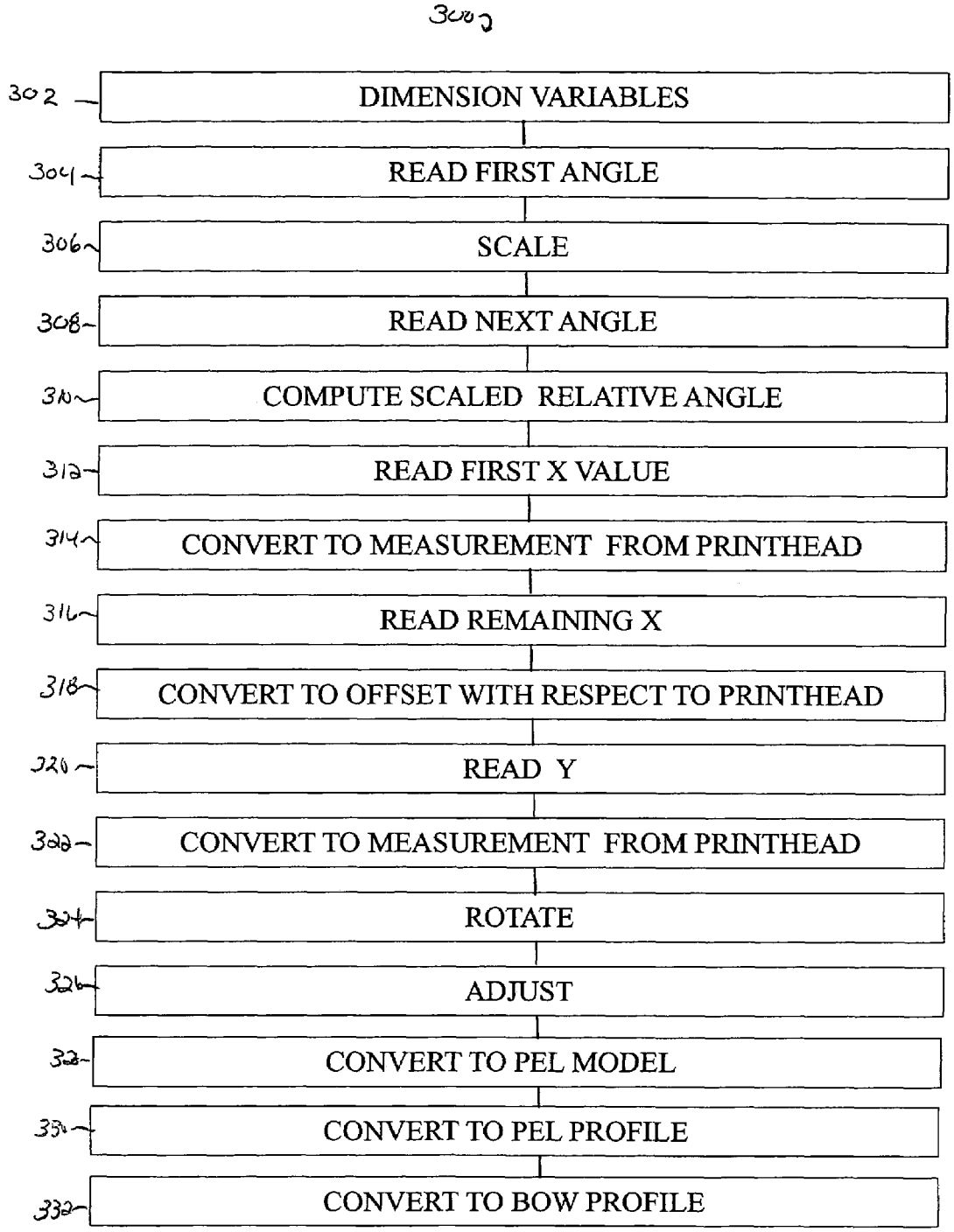
FIG. 5 is a flow chart for creating a bow profile that characterizes process direction position errors of a corresponding laser beam as it traverses across its scan path.

Referring to FIG. 5, a flowchart illustrates a more detailed method 300 for computing a bow profile 35. The following procedure is repeated by the software instructions executed on the microprocessor 18 for each of the four sets of laser beam position measurements stored in the memory device 28, and may be executed prior to performing a printing operation, during printhead installation, during printer startup or reset, or when necessary, e.g., due to a change in certain operational parameters such as an adjustment to the print output resolution or the adjustment of registration data.

The necessary variables are initialized at 302. For example, the laser beam position measurements 30 are retrieved from the memory device 28 by the microprocessor 18 and are stored as arrays in an appropriate memory location within the printer. Assume that there are n measured beam positions, which may be in a format as set out in Table 1, e.g., fifteen measurements for each scan plane where each beam position is characterized by X, Y coordinates and a corresponding polygon mirror angle A. Three arrays are dimensioned in appropriate memory locations within the printer for each laser beam. For clarity herein, the three arrays for each beam are designated Angle[ ], X_vector_wrt_printhead[ ], and Y_vector_wrt_printhead[ ], all of size n.

The angle array Angle[ ] is populated with the angle measurements A for a given scan plane. The first angle value $A_0$ is read out from the memory device 28 at 304. Depending upon how the angle measurement was recorded, it may be necessary to scale the angle read from the memory device. For example, a scanner angle may be measured to within several decimal places of accuracy. In order to avoid storing angles with their fractions, a scaling may optionally be provided to the measurement before being stored in memory. That is, each measured angle may be multiplied by an integer that is at least as large in magnitude as the number of decimals of precision of the angle measurement being scaled to convert that angle to an integer.

For example, a hypothetical angle measurement of 5.612 degrees can be scaled by an integer greater than, or equal to 1000 (corresponding to three decimal places of precision). In one exemplary application, each angle measurement is scaled (multiplied) by 8192. As such, when reading the angle measurements out from the memory device 28, the first angle value $A_0$ is adjusted to remove the scaling factor by dividing the value $A_0$ by 8192 (or what ever value was used to scale the angle measurements), and the results of the computation are stored in the Angle array. That is, Angle[0]=$A_0$/8192. The remaining fourteen angles $A_1$-$A_{14}$, stored in the memory device 28 are treated as offsets from the first angle Angle[0] and are derived by reading out an angle values, converting the angle, e.g., dividing the corresponding value by the scaling factor, e.g., 8192, and adding it to the previous angle at 310. For example, Angle[1]=$A_1$/8192+ A[0]; Angle[2]=$A_2$/8192+A[1] etc. This generalizes to:

$$\text{Angle}[k]=A_k/8192+\text{Angle}[k-1]$$

where $1<=k<=n-1$ and n=total number of entries in the array.

As noted above, the scan direction and process direction beam position measurements (X, Y) for each of the sets of test points $P_0$-$P_{14}$ are stored in the memory device 28 relative to their local scan plane origin 116, 118, 120, 122. However, to construct a corresponding laser beam scan path model 32, the X and Y values must be expressed with respect to the printhead origin 132. For each scan plane, the first X measurement ($X_0$) is read at 312, and is converted to a measurement relative to the printhead origin at 314. The above calculation is as follows for a beam position measurement corresponding to the black scan plane 114:

$$x\_vector\_wrt\_printhead[0]=X_0+Xb-Xs;$$

Because the remainder of the X measurements for the black scan plane 114 are offsets relative to the previous measurement, subsequent X measurements are read at 316 and are converted to an offset measurement relative to the printhead origin 132 at 318. The subsequent X measurements are calculated by adding the next offset to the previously computed value.

$$x\_vector\_wrt\_printhead[k]=x\_vector\_wrt\_printhead[k-1]+X_k;$$

where $1<=k<=n-1$. Notably, because the remainder of the test points $X_1$-$X_{14}$ are offsets, only the first test point $X_0$ needs to be mapped to the printhead origin.

Similarly, for the yellow scan plane 112:

$$x\_vector\_wrt\_printhead[0]=X_0+Xy-Xs;$$

$$x\_vector\_wrt\_printhead[k]=x\_vector\_wrt\_printhead[k-1]+X_k;$$

where $1<=k<=n-1$.

However, for the cyan and magenta beams, the computations must be inverted because the laser scan direction is opposite that of the yellow and black laser beams as noted above. That is, for the cyan scan plane 108:

$$x\_vector\_wrt\_printhead[0]=-1*X_0+Xc-Xs;$$

Subsequent X components of the vector are derived by subtracting the current X measurement from the previous offset.

$$x\_vector\_wrt\_printhead[k]=x\_vector\_wrt\_printhead[k-1]-X_k;$$

And for the magenta scan plane 110:

$$x\_vector\_wrt\_printhead[0]=-1*X_0+Xm-Xs;$$

$$x\_vector\_wrt\_printhead[k]=x\_vector\_wrt\_printhead[k-1]-X_k;$$

where $1<=k<=n-1$.

The Y measurements for each scan plane are read from the memory device 28 at 310 and are converted to measurements relative to the printhead origin at 322. Notably, the Y direction is oriented consistently for each color scan plane. Moreover, each Y measurement is recorded as an absolute value with respect to the corresponding local scan plane origin. Accordingly, the Y measurements are calculated as follows for all four beams:

$$y\_vector\_wrt\_printhead[k]=Y_k+Yc-Ys;$$

$$y\_vector\_wrt\_printhead[k]=Y_k+Ym-Ys;$$

y_vector_wrt_printhead[k]=$Y_k$+Yy−Ys;

y_vector_wrt_printhead[k]=$Y_k$+Yb−Ys where 0<=k<=n−1.

Upon completing the above calculations, the data points for each color plane define a laser beam scan path model 32 that describes the corresponding laser beam scan path. Each model is rotated at 324, optionally adjusted, such as for skew at 326, and the bow profile is created at 328. These processes are set out below.

Rotation of the Laser Beam Model

Figure 6:
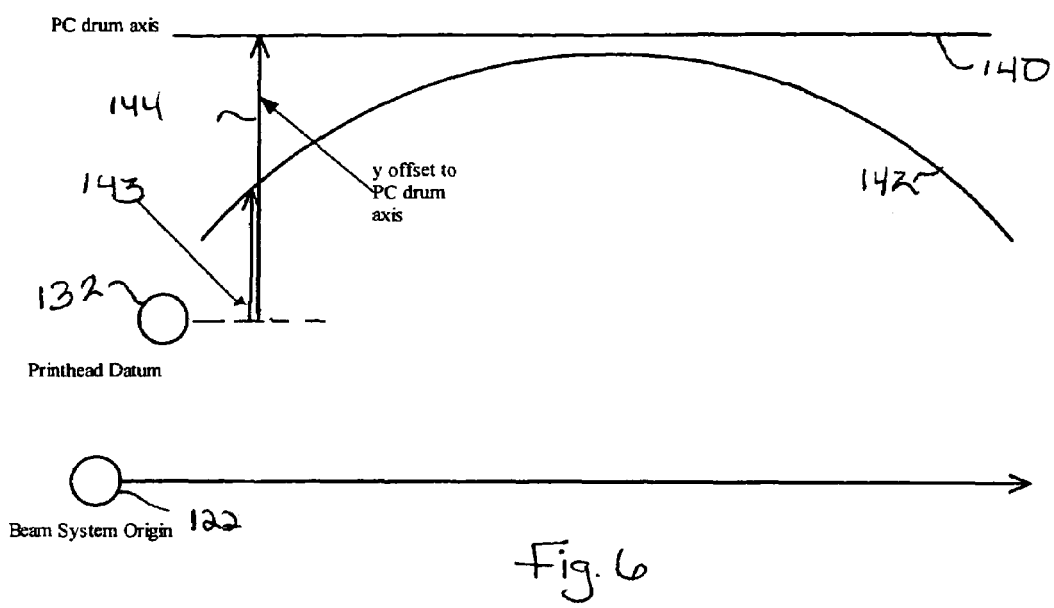
FIG. 6 is a schematic illustration of a laser beam profile with respect to a photoconductive drum axis.
Figure 7:
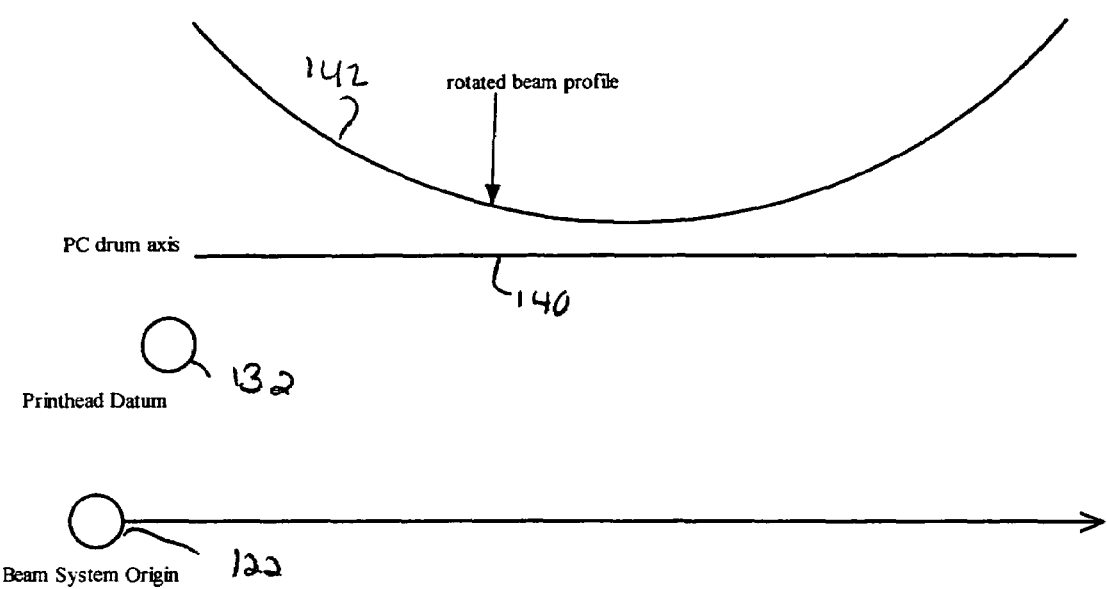
FIG. 7 is a schematic illustration of the laser beam profile of FIG. 6 rotated about the photoconductive drum axis.

An exemplary laser beam scan path model 32 is schematically represented in FIG. 6 as it appears on the corresponding PC drum. In practice, the photoconductive drum surface transfers a developed image, i.e., a toner image, onto a printed page as a mirror image of that on the photoconductive drum. Therefore, each laser beam scan path model 32 must be rotated about a corresponding PC drum axis 140 so that the laser beam scan path model 32 represents what would appear on a printed substrate or page. That is, the data points of each laser beam scan path model 32 must be repositioned in the process direction so as to define a mirror image of the scan path of the corresponding laser beam. For example, as shown, the test point measurements that comprise the corresponding laser beam scan path model 32 have been smoothly connected to represent a laser beam scan path profile 142 as the corresponding laser beam traverses across its scan path. Notably, the data points that comprise the laser beam scan path model 32 are schematically illustrated as a curve 142 for illustrative purposes. As shown, the curve 142 has a Y offset 143 from the printhead origin 132 to the curve 142. The PC drum has a Drum offset 144 from the printhead origin 132. In order to translate the laser beam scan path model 32 to the substrate, the model must be rotated about the PC drum axis 140 according to the following formula:

y_vector_wrt_printhead[k]$_{(rotated)}$=2*Drum offset−Y offset for k=0 to n−1. After rotation, the laser beam scan path model 32 should be rotated about the PC drum axis 140 as shown in FIG. 7.

Laser Beam Model Adjustments

Referring back to FIG. 5, the laser beam scan path models may optionally be adjusted at 326. Such adjustments can be used to compensate for characteristics such as additional laser beam bow and/or skew. Before performing such adjustments, a few necessary parameters are examined.

Locating the First Writable Pel

For each Pel profile 33, Pel 0 begins at the position where a corresponding detect-to-print control signal expires. The detect to print control signal is actually a combination of a nominally stored value and an offset that is stored as part of the machine registration data. The nominal detect to print component is schematically illustrated in FIG. 2 by the angle $A_{ndp}$ (the angle of the rotating polygon mirror at the nominal detect-to-print signal expiration) as noted above. Accordingly, to determine the location of Pel 0, the detect to print control signal must be converted to a beam angle. However, the offset from the stored registration data may be stored in other formats. As such, it may be convenient to convert the nominal detect to print angle $A_{ndp}$ to a time DetTo Print$_{(time)}$, convert the offset to a time, add the DetTo Print$_{(time)}$ to the offset time, then convert the results back to an angle. To convert $A_{ndp}$ to a time:

$$DetToPrint_{(time)} = A_{ndp} \text{ (degrees)} * \frac{(rev)}{360 \text{ (degrees)}} * \frac{1 \text{ (min)}}{\omega_{polygonalmirror} \text{ (rev)}} * \frac{60 \text{ (sec)}}{1 \text{ (min)}}$$

where $\omega_{polygonalmirror}$ is the angular velocity of the rotating polygonal mirror. The approach used to convert the offset will depend upon how the offset is stored. For example, an offset may be represented by a signed integer (so that the location of Pel 0 can be adjusted to the left or right) where each increment (+ or −) corresponds to a given number of Pel locations per value at a specified resolution. For example, one increment of offset may be defined as four Pel locations at 600 dpi. This example is converted to time by the following formula:

$$Offset_{(time)} = OffsetValue * PelsPerValue * \frac{CurrentResolution}{OffsetResolution} * SubClocksPerPel * TimePerClock$$

So, assume that the system is working at a 1200 dpi resolution, the stored Offset is +1, each offset represents 4 Pels at 600 dpi and there are six slice clocks or sub clocks per Pel. This corresponds to 1*4*1200/600*6*τ or an offset in of 48τ where τ is the period of a clock cycle.

The angle for Pel 0 is thus:

$$Angle_{(Pel0)} = (DetToPrint_{(time)} + Offset_{(time)}) \text{ (sec)} * \frac{360 \text{ (degrees)}}{(rev)} * \frac{\omega_{polygonalmirror} \text{ (rev)}}{(min)} * \frac{(min)}{60 \text{ (sec)}}$$

Linear Interpolation

With the beam angle of Pel 0 computed for a given scan plane 108, 110, 112, 114, a search is conducted of the corresponding beam position angle measurements Angle[k] (0≤k≤n−1) for that scan plane to find the two beam measurements that the angle falls between. Essentially, the search identifies the upper bound and the lower bound of Pel 0. An assumption is then made that the X position of the beam is linear with respect to beam angle between the upper and lower bounds. The X position of Pel 0 is then found using linear interpolation by the following formula:

Pel 0 X position=(Pel 0 beam angle−lower bound beam angle)/(upper bound beam angle−lower bound beam angle)*(upper bound X position−lower bound X position)+lower bound X position The Y position maybe found with the following formula:

Pel 0 Y position=(Pel 0 beam angle−lower bound beam angle)/(upper bound beam angle−lower bound beam angle)*(upper bound Y position−lower bound Y position)+lower bound Y position It is possible depending upon the value of the skew correction offset and the selection of the location for the test points that the location of Pel 0 does not fall between any two test points. That is, the first test point $P_0$ may be past the location of Pel 0 in the scan direction. Under these circumstances, the X position of Pel 0 can be extrapolated from the slope of a line achieved by connecting $P_0$ to $P_1$.

Locating the Last Writable Pel Position

The scan direction location of $Pel_m$ is determined based upon the intended output size of the printed media. For example, for standard letter sized output, the scan direction measurement of $Pel_m$ relative to Pel 0 is 8.5 inches (21.6 cm, 215,900 microns).

The Y-offset of $Pel_m$ is determined using linear interpolation (if $Pel_m$ is bounded by test points) or extrapolation otherwise. For example, assume that test point $P_{13}$ is a lower bound and that $P_{14}$ is an upper bound on $Pel_m$. Also, assume that $\Delta X\_Pel_m$ is the scan direction distance between $Pel_m$ and $P_{13}$.

$Pel_m Yoffset=\Delta X\_Pel_m*(y\_vector\_wrt\_printhead[14]- y\_vector\_wrt\_printhead[13])/(x\_vector\_wrt\_ printhead_{(rotated)}[14]-x\_vector\_wrt\_ printhead_{(rotated)}[13])+y\_vector\_ wrt\_printhead_{(rotated)}[13]$ Likewise, the last beam position measurement may be located at a Pel location less than $Pel_m$. If this occurs, the process direction offset of $Pel_m$ may be extrapolated from the last two test points. For example, using a linear extrapolation, the slope of the interval between the last two measurements is taken. For example, using the above fifteen test points:

$$slope = \frac{y\_vector\_wrt\_printhead_{(rotated)}[14] - y\_vector\_wrt\_printhead_{(rotated)}[13]}{x\_vector\_wrt\_printhead[14] - x\_vector\_wrt\_printhead[13]}$$

The X-axis (scan line) position of $Pel_m$ (which results in an X-location beyond the last X sample location) is known as noted above. The determined slope is multiplied by the difference between the $Pel_m$ X position and the last sample, X position. The above result is then added to the Y-axis measurement of the last test point, and the last sample location is converted to be $Pel_m$ with the proper Y offset in Pels. Assume that $\Delta X\_Pel_m$ is the scan direction distance between $Pel_m$ and $P_{14}$.

$Pel_m Yoffset=slope*\Delta X\_{Pelm}+y\_vector\_wrt\_printhead [14]$

Bowing and Skewing the Laser Beam Scan Path Model in Memory

The laser beam position measurements 30, noted above, are taken prior to installing the printhead 14 in a corresponding printer, and will indicate if one or more laser beams are creating bowed and/or skewed scan lines. However, additional bowing and/or skewing of one or more laser beams may result after installation of the printhead 14 in the printer. So as to detect any additional bowing and/or skewing of a scan line written by any of the laser beams, a user or technician can perform registration diagnostics and provide correction adjustments to the printer, to compensate for bow and/or skew of one or more laser beams. For example, a test page may be printed and analyzed. An operator can then provide adjustments, such as by entering correction values into an operator panel on the device. The correction values may be stored in a memory location accessible by the controller 12 including being stored in the memory device 28 on the printhead 14.

Skew Compensation

As an example, a skew correction offset may be used to indicate the process direction amount of skew detected on the test page as measured from a point near the leftmost edge of the test page relative to a point near the rightmost edge of the test page. A positive offset correction value may indicate that the process direction amount of skew is towards the top of the page. Correspondingly, a negative offset correction value may indicate the process direction amount of skew towards the bottom of the page.

The skew measured from the test page above, is an offset of a fixed point located near the rightmost edge of the printed test sheet (this corresponds to location $Pel_m$ discussed above) relative to a fixed point near the leftmost edge of the printed test sheet (which corresponds to location Pel 0 discussed above). Let the skew measured from the test page be designated as $\Delta y_m$. Because the skew is a rotation of the laser beam scan path about Pel 0, a new $\Delta y$ will have to be calculated for each test point in the laser beam scan path model 32.

Thus it can be seen that skew correction can be accomplished by the below formula.

$y\_vector\_wrt\_printhead[k]_{(rotated\ and\ skew\ corrected)}= y\_vector\_wrt\_printhead[k]_{(rotated)}+\Delta y_k$ for $0<=k<=14$ (for all test points)

Any skew present in a given laser beam when the corresponding beam position measurements $P_0$-$P_{14}$ were taken prior to assembly of the printhead into the printer is taken into account by $y\_vector\_wrt\_printhead[k]_{(rotated)}$. Any additional skew amount resulting after installation of the printhead in the printer is taken into account by $\Delta y_k$.

Finding the Process Direction Offset Due To Skew Correction

Figure 8A:
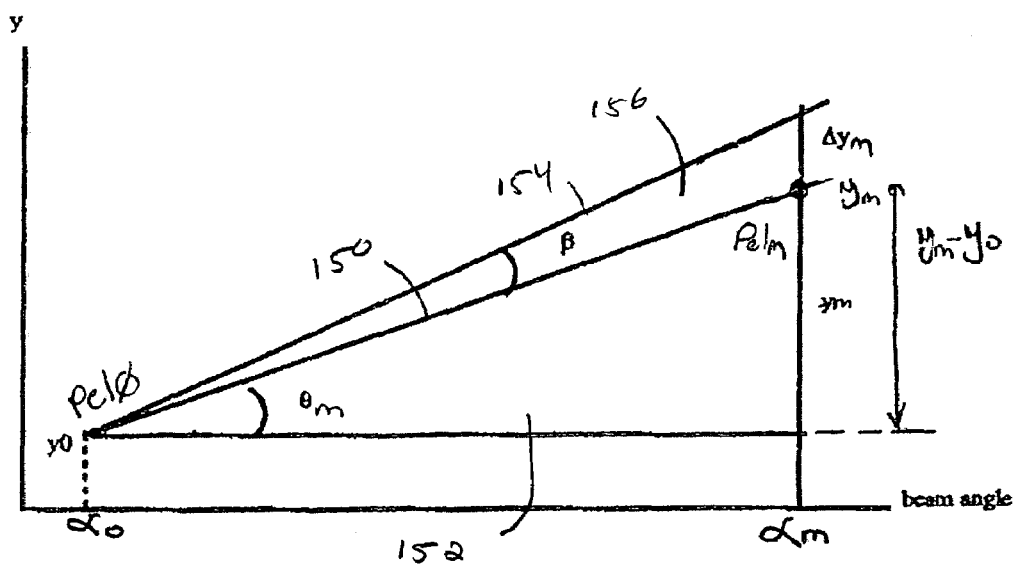
FIG. 8A is a schematic illustration of a method for determining laser beam skew showing rotation of the last writable Pel relative to the first writable Pel.

Referring to FIG. 8A, points Pel 0 and $Pel_m$ are plotted on a graph where the process direction values are plotted on the Y-axis and the corresponding angle measurements are plotted on the X-axis. The test points therebetween have been removed for clarity. In general terms, the Pel 0 coordinates are designated as $\alpha 0$, y 0 where $\alpha$ is the rotating polygonal mirror angular measurement at the location of Pel 0, and y0 is the corresponding process direction offset. Correspondingly, the $Pel_m$ coordinates are designated as $\alpha m$, ym. Alternatively, the coordinates for the last test point $P_{14}$ may be substituted therefore.

For conceptual purposes, an imaginary first straight line 150 is drawn connecting $\alpha 0$, y0 to $\alpha_m$, $y_m$. Based upon the first straight line 150, a theoretical right triangle 152 may be defined, and an angle $\theta_m$ can be computed as follows:

$$\tan \theta_m = \frac{(y_m - y_0)}{(x(\alpha_m) - x(\alpha_0))}$$

$$\theta_m = \tan^{-1}\left[\frac{(y_m - y_0)}{(x(\alpha_m) - x(\alpha_0))}\right]$$

It should be noted that the bow and skew inherent in the laser beam at the time that the corresponding beam position measurements 30 were taken, are incorporated into the process direction offsets ($y_0$) for Pel 0 and ($y_m$) for $Pel_m$. Assume that additional skew correction is provided as an operator entered, skew correction offset as noted above corresponding to additional skewing occurring after the installation of the printhead 14 in the printer. For illustrative purposes, assume that the additional skew causes a corresponding scan line to be rotated upwards so as to move the endpoint $y_m$ up by an additional $\Delta y_m$ Pels. The value $\Delta y_m$ thus corresponds to the skew correction offset entered by the operator in the operator panel.

A second imaginary line 154 is drawn connecting $\alpha 0$, $y 0$ to $\alpha_m$, $(y_m + \Delta y_m)$. The second imaginary line 154 is provided for contextual purposes to help envision the skew correction method set out herein. As can be seen, the second imaginary line 154 is merely the first imaginary line 150 rotated about Pel 0 by the angle $\beta$. As such the corresponding new angle for the new right triangle 156 is $(\theta_m + \beta)$, which can also be expressed by:

$$\tan(\theta_m + \beta) = \frac{(\Delta y_m + y_m - y_0)}{(x(\alpha_m) - x(\alpha_0))}$$

$$(\theta_m + \beta) = \tan^{-1}\left[\frac{(\Delta y_m + y_m - y_0)}{(x(\alpha_m) - x(\alpha_0))}\right]$$

Figure 8B:
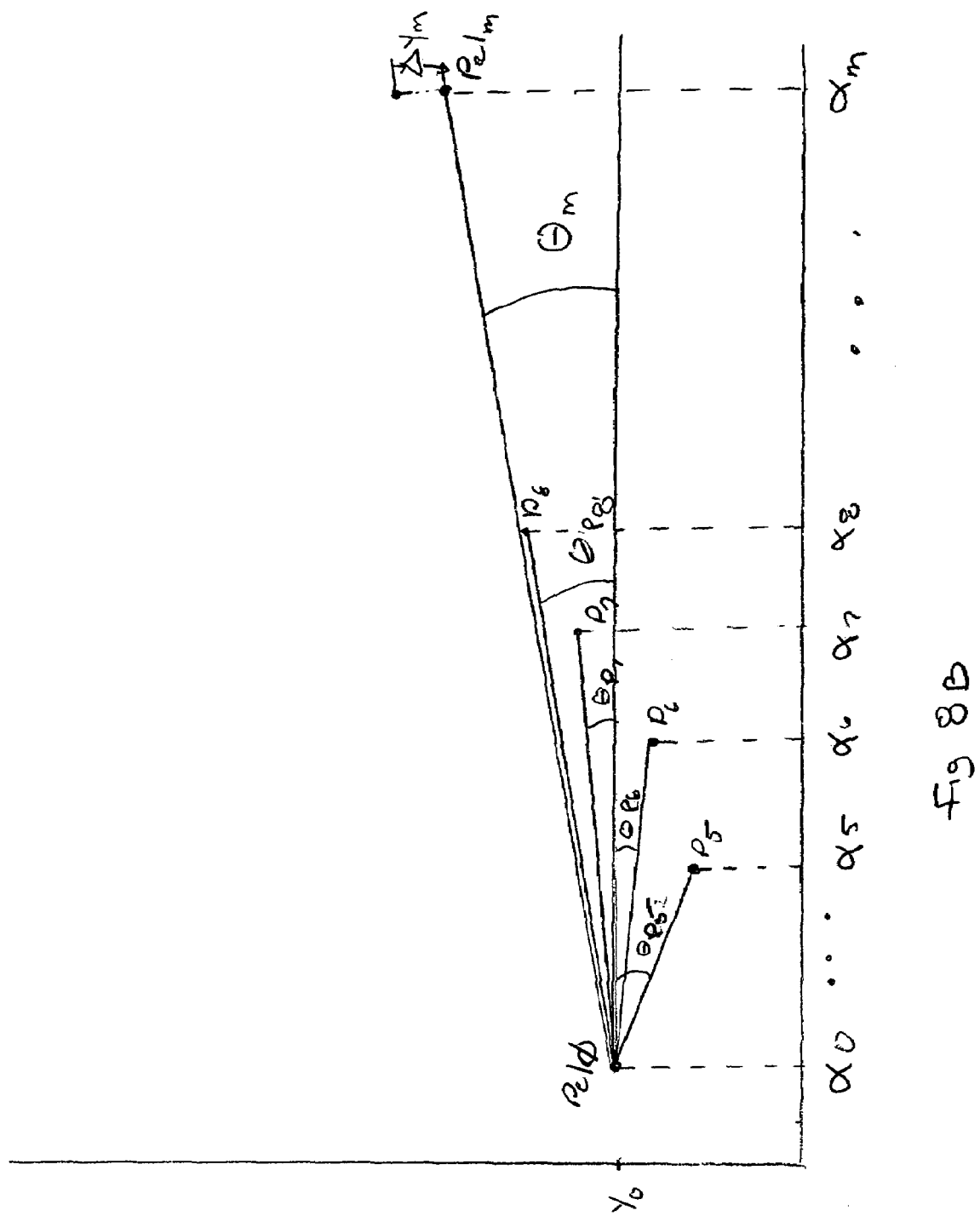
FIG. 8B is a schematic illustration of the method for determining laser beam skew illustrated in FIG. 8A showing additional test points.

It can be observed that the angle $\beta$ will be constant for each laser beam measurement in the corresponding laser beam scan path model 32 because, as noted above, it was presumed that the additional skewing resulting from the entire scan line being pivoted or rotated about a fixed point, e.g., Pel 0. However, the angle $\theta$ may vary for each test point in the laser beam scan path model 32 because the process direction value ($y\_vector\_wrt\_printhead[k]_{(rotated)}$) corresponding to each test point will likely not fall on the first imaginary line 150. An example of this is illustrated in FIG. 8B, which shows a few exemplary data points plotted to illustrate that the angle $\theta$ for each data point P relative to Pel 0 may vary. Therefore, it may be convenient to solve for $\beta$ as follows:

$$\beta = (\theta_m + \beta) - \theta_m$$

$$\beta = \tan^{-1}\left[\frac{(\Delta y_m + y_m - y_0)}{(x(\alpha_m) - x(\alpha_0))}\right] - \tan^{-1}\left[\frac{(y_m - y_0)}{(x(\alpha_m) - x(\alpha_0))}\right]$$

An angle $\theta_k$ with respect to Pel 0 can be computed for each corresponding angle measurement $\alpha_k$ i.e., each angle laser beam position measurement as follows:

$$\theta_k = \tan^{-1}\left[\frac{(y_k - y_0)}{(x(\alpha_k) - x(\alpha_0))}\right]$$

for $k \leq 0 \leq n-1$.

With $\beta$ known and $\theta_k$ determinable, the process direction change $\Delta y_k$ due to the skew rotation can be computed for each test point.

$$\tan(\theta_k + \beta) = \frac{(y_k + \Delta y_k - y_0)}{(x(\alpha_k) - x(\alpha_0))}$$

Accordingly, the corresponding y offset $\Delta y_k$ can be computed.

$$\Delta y_k = (x(\alpha_k) - x(\alpha_0)) * \tan(\theta_k + \beta) - y_k + y_0$$

Each computed offset $\Delta y_k$ for each test point is added to its process direction offset (y-value) to achieve the skew corrected value. That is, $y\_vector\_wrt\_printhead[k]_{(rotated\ and\ skew\ corrected)} = y\_vector\_wrt\_printhead[k]_{(rotated)} + \Delta y_k$ for $0 \leq k \leq 14$ (for all test points)

Bow Compensation

A bow correction offset may be used to indicate the process direction amount of bow detected on a printed test page. For example, to determine an amount of bow, three targets may be printed on the test page along a common line, including a first target printed near the leftmost edge of the test page, a second target printed near the rightmost edge of the test page, and a third target printed generally at the midpoint between the first and second targets. The amount of bow may be determined by analyzing the first, second and third targets, and computing the offset of the third (midpoint) target relative to the first and second (endpoint) targets. For example, the position of the third target in the process direction (up the page) may be compared to the average of the first and second targets in the process direction, and a correction may be entered into the printer. The position of the first and second targets may be averaged to factor out the effects of any skew present in the printing of the test page.

The correction offset corresponding to the amount of detected bow may be either positive, indicating a bow correction is required in a first direction, or negative, indicating a bow correction is required in a second direction. Because bow can be generally characterized as a parabola that affects the laser beam scan path, a $\Delta y_{bowcorrection}$ may be calculated and used to modify the process direction position value for each test point in the corresponding laser beam scan path model 32. Any bow present in a given laser beam when the corresponding beam position measurements $P_0$-$P_{14}$ were taken prior to assembly of the printhead into the printer is taken into account by $y\_vector\_wrt\_printhead[k]_{(rotated\ and\ skew\ corrected)}$. Any additional bow amount resulting after installation of the printhead in the printer is thus taken into account by $\Delta y_{k\_bowcorrection}$.

Characterizing the Bow Offset Correction Value

The manner in which bow compensation is performed will depend upon the manner in which bow information is extracted from the test sheets. However, as an example, it may be assumed that a bow offset entered into the operator panel represents an offset adjustment that would be required to straighten out the bowed line. To simplify the computations necessary to map the offset derived from the test sheet to each test point in the corresponding laser beam scan path model 32, it may be assumed that the additional bow is represented by a vertical parabola having X-axis intercepts defined by the first and last test points, e.g., $P_0$ and $P_{14}$, and a vertex defined by coordinates at the midpoint between $P_0$ and $P_{14}$ with a Y-axis offset defined by the operator entered bow offset. That is, it may be assumed that a vertical parabola is constructed in an imaginary plane having its origin at the coordinates corresponding to test point $P_0$. As such, the parabola passes through test point $P_0$ at location (0,0) and passes through test point $P_{14}$ at location ((x_vector_wrt_printhead[14]-x_vector_wrt_printhead[0]), 0). In the above example, a positive bow offset correction value indicates that the third (midpoint) target is above the first and second (endpoint) targets, i.e., the vertical parabola opens downward. Correspondingly, a negative bow offset correction value indicates that the third (midpoint) target is lower than the first and second (endpoint) targets, i.e., the vertical parabola opens upward.

To compute the coordinates for the vertex of the parabola, some data conversion may be required. For example, the bow offset correction may be entered as a signed integer corresponding to a predetermined increment of bow offset, e.g., each increment may correspond to $1/1200^{th}$ of an inch of correction. However, the coordinates corresponding to the associated test points $P_0$-$P_{14}$ may be stored in a different unit of measure, e.g., microns. Given the above exemplary units of measure, the Y coordinate of the vertex of the parabola is computed in microns as follows.

$Y_{(max\ parabola\ height)}$=(bow offset)*1/1,200 in*25.4 mm/in*1000 microns/mm The max parabola height is assumed to occur at the midpoint between the first and last test points, e.g., $P_0$ and $P_{14}$, thus:

$X_{(max\ parabola\ height)}$=1/2*(x_vector_wrt_printhead [14]-x_vector_wrt_printhead[0])

A first basic equation for a parabola may be expressed as:

$y=ax^2+bx+c$

Based upon the above assumptions, three data points that lie along the path of the imaginary vertical parabola are known thus each of the coefficients a, b and c may be computed. Notably, the assumption that test point $P_0$ lies at location (0,0) simplifies the solution for the coefficients because c is trivially zero.

Given that c=0, the coordinates corresponding to test point $P_{14}$ may be inserted into the first basic equation of a parabola and the coefficient b may be solved for in terms of the coefficient a. That is:

$b=-a$*(x_vector_wrt_printhead[14]-x_vector_wrt_printhead[0])

Thus it can be seen that:

$$a = \frac{Y_{(max\ parabola\ height)}}{X_{(max\ parabola\ height)}^2 - [X_{(max\ parabola\ height)} * (\text{x\_vector\_wrt\_printhead}[14] - \text{x\_vector\_wrt\_printhead}[0])]}$$

As another simplifying step, the basic equation for the parabola may be represented by the equation:

$y=a(x-h)^2+k$ where h is the X-axis coordinate of the vertex ($X_{(max\ parabola\ height)}$) and k is the Y-axis coordinate of the vertex ($Y_{(max\ parabola\ height)}$). Accordingly, the general equation for the parabola can be rewritten as follows:

$\Delta y_{k\_bowcorrection}$=a((x_vector_wrt_printhead[j]-x_vector_wrt_printhead[0])-h)$^2$+k for 0<=j<=14 (for all test points)

Accordingly, bow correction based upon the corresponding bow offset derived from the registration diagnostics can be accomplished by the below formula.

y_vector_wrt_printhead[k]$_{(rotated,\ skew\ and\ bow\ corrected)}$= y_vector_wrt_printhead[k]$_{(rotated\ and\ skew\ corrected)}$+ $\Delta y_{k\_bowcorrection}$ for 0<=k<=14 (for all test points)

Of course, each color image plane may have a unique bow offset, so the above corrections may be independently computed for the test points for each color image plane.

Other Miscellaneous Corrections

Also, once the laser beam scan path model 32 is properly constructed, it is possible to perform any sort of scaling thereof. For example, margin adjustments, the lengthening or shortening of a line can be implemented by scaling the corresponding computed laser beam scan path model 32. It should also be noted that the velocity of the laser beam changes as it is swept in a scan direction. As such, some linearity correction may be required. Linearity correction and marginlline length corrections are set out in U.S. Pat. Pub. No. 2005-0212905, entitled "Systems For Performing Laser Beam Linearity Correction And Algorithms And Methods For Generating Linearity Correction Tables From Data Stored In An Optical Scanner", which is already incorporated by reference herein.

Converting the Laser Beam Scan Path Model to a Pel Model

It is often easier to work in Pels compared to other distance based position measurements, e.g., microns, millimeters, etc., when converting a given laser beam scan path model 32 to a corresponding Bow profile 35. Referring back to FIG. 5, the rotated and skew adjusted laser beam scan path models 32 are converted into corresponding Pel models 33 at 328. A Pel model 33 is essentially a laser beam scan path model 32 where scan direction measurements in the laser beam scan path model are converted to Pel locations, and rotated and skew corrected process direction measurements in the laser beam scan path model 32 are converted to Pel offsets.

Notably, when creating the Pel model 33, the system may only be concerned with the Pel positions that can be written to a page. As such, the Pel model 33 may contain Pel locations and corresponding offsets falling within the range of Pel 0 to Pel$_m$. The test points from the corresponding laser beam scan path model 32 between and including Pel 0 and P$_m$ thus define the Pel model 33.

For each Pel model 33, the Y offset in Pels are found by converting the scale of the corresponding process direction (rotated and skew corrected Y values) from the associated laser beam scan path model 32, e.g., microns, millimeters, etc., to Pels using an appropriate conversion taking resolution into account. For example, microns may be converted to Pels at 1200 dpi using the following equation:

1200 dpi Pel_y_vector_wrt_printhead[k]$_{(rotated,\ skew\ and\ bowcorrected)}$=y_vector_wrt_printhead[k]$_{(rotated,\ skew\ and\ bow\ corrected)}$ in microns÷1000 microns/mm÷25.4 mm/inch*1200 dots/inch (the desired resolution)

As noted above, with regards to the scan direction, i.e., the Pel locations, the first entry into the Pel model starts at Pel 0. An exemplary method for finding Pel 0 was set out above in the discussion of "Locating the First Writable Pel", where Pel 0 was found through linear interpolation or extrapolation. The Pel location for each test point in an associated laser beam scan path model 32 is calculated by taking the difference in the scan direction (X positions) of two adjacent test points in the corresponding laser beam scan path model 32, and converting that distance into a distance in Pels at a given resolution. This can be accomplished for example, by applying an appropriate scaling, an example of which is shown above. That is, the distance measurement is converted to inches and is multiplied by the desired resolution in dots per inch. That result is added to the Pel location of the previous test point. For example, assuming a resolution of 1,200 dpi, to find the Pel location and offset corresponding to test point $P_j$, the following equation may be used. Of course, other resolutions may alternatively be used, and the equations should be modified accordingly. It should also be noted that if a computed Pel value is fractional, then the value may be rounded to the nearest Pel.

$X\_\text{test point}_{(j)} = (x\_\text{vector\_wrt\_printhead}[j] - x\_\text{vector\_wrt\_printhead}[j-1])$ in microns÷1000 microns/mm÷25.4 mm/inch*1200 dots/inch+$X\_\text{test point}_{(j-1)}$ for j=1 to n−1.

If it is necessary to compute the Pel location corresponding to test point $P_0$, an equation such as the one below may be used.

$X\_\text{test point}_{(0)} = (x\_\text{vector\_wrt\_printhead}[0]$ in microns÷1000 microns/mm÷25.4 mm/inch*1200 dots/inch $Y$ offset test point$_{(j)} = y\_\text{vector\_wrt\_printhead}[j]_{rotated, skew and bow corrected}$ in microns÷1000 microns/mm÷25.4 mm/inch*1200 dots/inch The last Pel location in each Pel model ($\text{Pel}_m$) may be derived based upon the desired output and the print resolution of that output. For example, for standard letter size print media (8.5 inches or 21.6 centimeters) at 1,200 dpi resolution, the location of $\text{Pel}_m$ would be 10,200 (8.5×1,200). At 600 dpi and a standard letter sized print media, the location of $\text{Pel}_m$ would be 5,100 (8.5×600), etc. The y offset in Pels for location $\text{Pel}_m$ is:

$Y$ offset $\text{Pel}_m$(in Pels)=$y\_\text{offset}$ $\text{Pel}_{m(rotated, skew and bow corrected)}$ in microns÷1000 microns/mm÷25.4 mm/inch*1200 dots/inch When analyzing the converted beam position measurements, a number of checks may be established. For example, it is possible for a beam measurement location to be positioned beyond a printed page. If such occurs, processing should stop traversing through the data points and move on to the next task.

The Pel Profile

The Pel models 33 are expanded into corresponding Pel profiles 34 at 330. For example, the microprocessor 18 may assign an offset for each Pel location between $\text{Pel}_0$ and $\text{Pel}_m$. This can be performed by curve fitting, linear approximation or any other desired line connecting algorithms. An example is discussed below.

Data Structure for the Pel Profile

The Pel profile 34 can be represented as a data structure having generally, three fields including a channel, a software offset and a bit profile. The channel defines which hardware channel is the current Pel profile 34 intended, i.e., which color image plane (cyan, magenta, yellow or black-CYMK) is the current Pel profile 34 associated with. The software offset defines the initial offset from "top" of profile at a given resolution (e.g., in 1200ths). The software offset is calculated by taking the Pel 0 y position and calculating how many Pels it is below the maximum Y offset of the Pel profile 34. A bit profile is used to actually encode the shape of the Pel profile 34. The bit profile assigns two bits per Pel location (two bits per Pel), encoded as follows: 00—no bow; 01—bow down the page by $1/1200^{th}$; 11—bow up the page by $1/1200^{th}$; and 10—invalid value. Of course, other assignments may alternatively be used. The above assumes a resolution of a $1,200^{th}$ (1,200 dpi) in both the scan and process directions, which can also vary depending upon the specific application and scaling for other resolutions can easily be implemented in the alternative.

Rules for Constraining the Pel Profiles

In order to facilitate efficient processing of the Pel profile 34, it is convenient to establish some rules that limit the scope of processing thereon. For example, one rule may assert that all Pel profiles are provided in "Left to Right" format as seen on the front side of a simplex page. Another rule asserts that as the Pel profile is "walked" bit by bit, the minimum offset should be 0. This means that the Pel profile 34 will "reach into" or include the uncorrected line of bitmap image data at least once, i.e., at least one Pel will not be shifted from its original line location in the process direction compared to the original bitmap image. Another way to visualize this is that the "highest" point on the Pel profile 34 will have an offset of 0.

Another convenient area to establish rules is to limit the "amplitude" of the Pel profile 34. As used herein, a vertical shift from one row of Pels to another is referred herein as a jump. Thus an exemplary rule may limit the magnitude of jumps for the entire Pel profile to 127 jumps or less. That is, the amplitude or maximum Y offset for any Pel between Pel 0 and $\text{Pel}_m$, e.g., Pel 10,200 must be 127 or less. If the Pel profile 34 is to be used for bowing relatively low resolution print data, e.g., at 1200×1200 dpi or less print resolution, a rule may assert that it is invalid to have a jump on consecutive locations of the profile. Notably, a jump on consecutive Pels in the Pel profile 34 may be acceptable when printing a relatively high process direction, e.g., 2400×600, because the scan resolution doubles to 2400 compared to the 1,200 dpi case.

The limitation of the amplitude of jumps to 127 (or any other arbitrary number) provides an overall check that limits the amount of electronic correction that can be used to compensate for laser process direction errors. However, it may further be helpful to establish rules that limit the total number of jumps within a smaller window. An exemplary rule in this regard may hold that it is not valid to have a bow magnitude of 8 or more jumps within a rolling 64-bit window in the Pel profile 34. Under such a rule, the maximum slope, i.e., amount of electronic correction to laser beam process direction position errors that can occur in any rolling 64-bit window is 7 jumps.

An exemplary section of a Pel profile 34 is set out in Table 2 to illustrate the two bits per Pel instructions.

TABLE 2

An Exemplary Section of a Pel Profile

|   |   |   |   |   |   |
|---|---|---|---|---|---|
|   |   | 1 | 0 |   |   |
|   |   | 1 | 0 |   |   |
| 0 | 0 |   |   | 0 | 0 |

TABLE 2-continued

An Exemplary Section of a Pel Profile

```
0  0        1  0
            0  0
            1  0
                  0  0
                  1  0
                        0  0  0        1  0  0  0  0  0
                        1  0  0        1  0  0  0  0  0
                              0  0                       0
                              1  0                       1
```

As discussed more explicitly below, to transform a Pel model 33 having a limited number of measurements to a Pel profile 34 that encompasses Pel locations from Pel 0 to Pel$_m$, the software executed by the microprocessor 18 defines a data structure that identifies the associated color image plane, a software offset, and a bit profile that represents the relative changes in process direction position of each Pel location along the associated scan path. In constructing each Pel profile 34, a few simplification processes can be implemented. For example, at 1,200 dpi printing, there are 10,200 Pels between Pel 0 and Pel$_m$ and two bits may be used to encode whether a relative process direction change occurs at each Pel location. As such, at least 20,400 bits are required in the bit profile to characterize the corresponding laser beam scan path. Accordingly, the Pel profile 34 is divided up into a plurality of arbitrarily sized words. For example, assume that each word comprises 32 bits and the resolution is 1200 dpi. Then 640 32-bit words are required to characterize the Pel profile 34. Reading from left to right then, Pel 0 is represented as bits 31-30 in the first word. Pel 1 is represented as bits 29-28 in the first word and so on. Pel 15 is represented as bits 1-0 in the first word etc.

Figure 9:
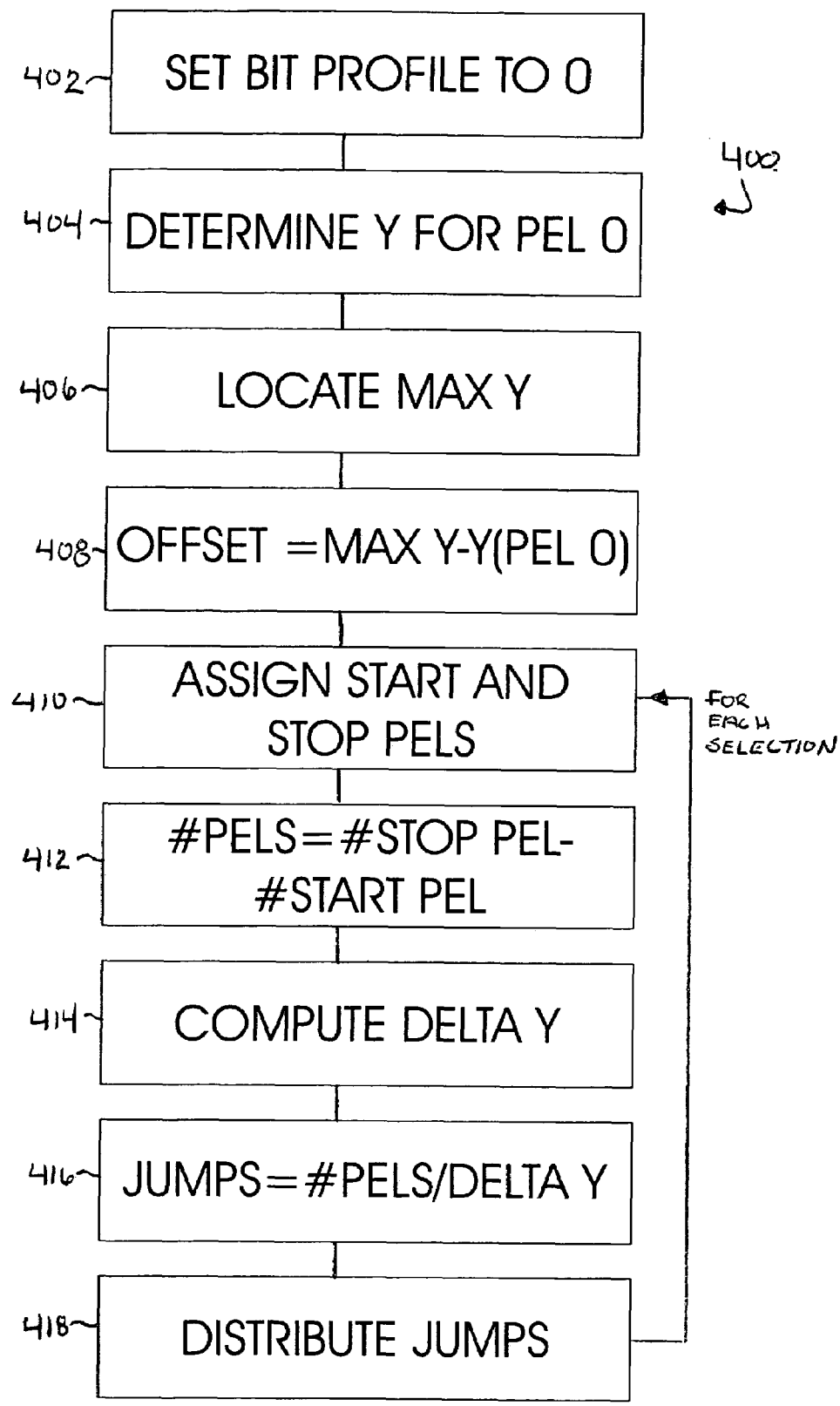
FIG. 9 is a flow chart illustrating a method for converting a scan path model into a Pel profile according to the present invention.

Referring to FIG. 9, a method 400 of constructing a Pel profile 34 for each color image plane can be implemented by initializing the channel to a value that defines its corresponding color image plane (CYMK).

The value for the software offset is computed by reading the Y offset value corresponding to Pel 0 at 404. Each of the Y offset values in the associated Pel model 33 are then compared to determine a maximum Y offset of the model at 406. The software offset is then defined as the maximum Y offset minus the Y offset of Pel 0. The software offset thus essentially characterizes the number of rows of Pels that the Pel 0 process direction offset (Y-value) is below the maximum offset of the Pel model 33.

The scan path is then divided up into a plurality of sections that span at least from Pel 0 to Pel$_m$. It may be convenient to identify the sections by reference to a corresponding start and stop Pel at 410. For example, the data points from the Pel model 33 may be selected to define the start and stop Pels for each section. The length of a section is determined at 412. The length of a section can be expressed as a number of Pels in the scan direction between the stop and start Pels, and may be found for example, by subtracting the start Pel location from the stop Pel location.

Figure 10:
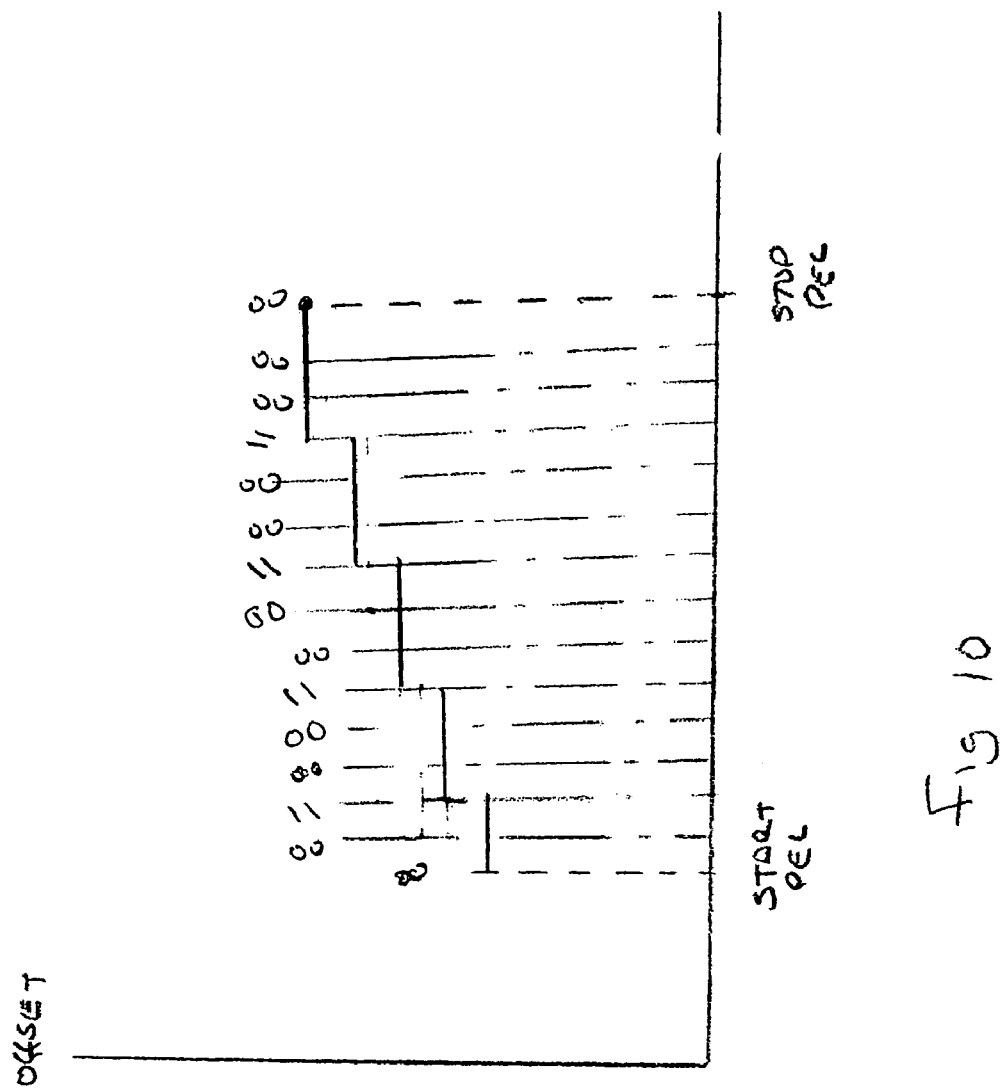
FIG. 10 is a chart illustrating the spacing of jumps between start and stop Pels.

A curve/line approximation is then used to determine the process direction offsets of Pel locations in the section. For example, where a linear approximation is used, the slope of the section is computed at 414. The slope may be identified by the change in Pels in the Y (process) direction. That is: $\Delta Y = Y(stop) - Y(start)$. The change in Pels in the Y direction defines the number of jumps that must occur to connect the start Pel to the stop Pel. For example, referring briefly to FIG. 10, an exemplary start Pel and corresponding stop Pel are plotted on a graph showing Pel locations along the X-axis, and process direction offsets along the Y-axis. As shown, the length of the exemplary section is 14 Pels and the slope is 4/14.

Referring back to FIG. 9, the jumps are then distributed at 418 across the section according to a desired encoding. One exemplary way to distribute the jumps is to divide the current section into generally evenly spaced increments based upon the number of jumps in the current section. For example, the increment is computed at 416 by dividing the number of Pels in the current section (in the scan direction as determined at 412) by the number of jumps (represented by the change in Pels in the Y direction determined at 414). Also as illustrated, there is one jump per increment, however, other jump schemes may be implemented. Referring back to FIG. 10, an exemplary generally evenly spaced distribution of jumps is illustrated. As shown, the four jumps are spaced generally evenly across the section.

Next, an encoding is generated. For example, given the above encoding (00—no jump, 01—jump down, 11 jump up), for each Pel location in the section where no jump occurs, that Pel location is assigned the two bit sequence 00 in the bit profile. Every Pel location that defines a jump up is encoded with a 11 in its corresponding location in the bit profile, and every Pel location that jumps down is encoded with a 01 in its corresponding location in the Pel profile 34. The process then continues until every section is processed. Any rounding scheme may be implemented to distribute the jumps so that they are generally spaced evenly. Referring back to FIG. 10, the two bit profile encoding is written above the jumps to illustrate how that Pel location is encoded. As a check, the microprocessor may optionally validate any implemented rules and declare an error if detected.

The Bow Profile

In order to perform hardware based image data warping, such as by the bow processor 20 shown in FIG. 1, it may be necessary to construct a bow profile 35 from an associated Pel profile 34. The Pel profile 34 differs from its corresponding bow profile 35 in that the Pel profile 34 defines how the bow correction data appears to the software executed by the microprocessor 18 in the system. The bow profile 35 on the other hand, defines the manner in which the same bow correction data appears to the hardware system of the bow processor 20. Referring back to FIG. 5, a Pel profile 34 is converted into a bow profile 35 at 322.

For example, software may transform each Pel profile 34 into a series of entries in a source address list that defines the instructions for the bow processing logic.

TABLE 3

Partial Source Address List/Vertical Strip Entry Bit Definition

| Bit 0 | Bow Direction | 1 Bow Up; 0 Bow Down |
| Bits 24:16 | Offset | Offset in scans of where to read destination data |
| Bit 63 | 65$^{th}$ bit Profile | Look ahead for the first bit of the next vertical strip of the bow profile. If set, indicates a reversal of direction on the last bit of this column i.e. would be the second bit of a 11 instruction. If cleared, no effect. |
| Bits 127:64 | Bow Profile | Bow Profile<br>0—no jump<br>1—jump one scan in the current direction<br>11—reverse current direction and jump<br>Left to Right—Cannot bow data more than every other bit |

The microprocessor 18 derives a bow profile 35 that is stored in the main system memory 16 for each Pel profile 34. The bow profiles 35 essentially translate their corresponding Pel profile 34 into a format suitable for processing by the bow processor 20. As one example, each Pel profile 34 is encoded into a corresponding bow profile 35 as part of a series of instructions, referred to generally as source address list entries. Each source address list entry encodes a portion, e.g., 64 Pel locations, of the Pel profile 34, and includes other operational data that the bow processor 20 may use during operation. The bow processor 20 and the bow profile 35, including corresponding source address list instructions executed thereby, are set out in greater detail in U.S. Pat. Pub. No. 2005-0212903, entitled "Electronic Systems And Methods For Reducing Laser Beam Process Direction Position Errors", which is already incorporated by reference herein.

The relevant portions of an exemplary source address list entry bit definition are illustrated in Table 3. Each source address list entry is a 128-bit instruction. Of those 128 bits, bit 0 encodes the jump direction for that instruction, bits 24:16 encode the offset for that instruction, bit 63 encodes a 65$^{th}$ bit look ahead, and bits 127:64 encode 64 adjacent Pel locations in the corresponding Pel profile 34 where each bit corresponds to one Pel location of the Pel profile 34 and determines whether a jump should occur at that position. Bits 127:64 of each source address list entry thus represent a corresponding 64 Pel location section of the corresponding bow profile 35. As set out in Table 3, for each of the bits 127:64 in a source address list entry instruction, a value of 0 indicates no jump, a value of 1 indicates a jump one scan line in a current direction and the sequence 11 indicates a reversal of the current direction and a jump.

Notably, in each source address list entry, only one bit of information is available to encode whether a jump is to occur at that given Pel location. Comparatively, in the Pel profile, two bits are assigned per Pel location to encode whether a jump is to occur. As such, to convert each Pel profile 34 to a corresponding bow profile 35, the microprocessor 18 breaks apart each Pel profile 34 into a plurality of (64 Pel location) sections and remaps the two-bit per Pel location format of the Pel profile 34 to one-bit per Pel location format in the associated source address list entry instructions.

Note from the bow profile definition in Table 3 that in order to designate a change of direction, a sequence of "11" is required. However, the bow profile only stores one bit per column. In order to encode a direction change, the microprocessor 18 takes advantage of two rules. Namely, the bow processor 20 processes the bow profile 35 from left to right, and cannot jump on adjacent Pel locations. Thus if the bow processor 20 is to perform a jump at a first Pel location (column), it cannot perform a jump on the Pel location (column) immediately to the right thereof. As such, if the microprocessor 18 detects a jump in the Pel profile 34, the jump is recorded in the corresponding location of the source address list instruction, and the bit just to the right thereof is used to program whether a change in direction of the jump is to occur. This approach essentially implements a "look ahead" feature. For example, a bit in the bow profile (bits 127:64 of a source address list entry) just to the right of a valid jump (bit value of 1) may encode whether to maintain the current direction (bit value=0) or to reverse direction (bit value=1) as set out in the bow profile definition in Table 3.

From a conceptual process, the microprocessor 18 traverses each Pel profile 34 starting at Pel 0 and works across to Pel$_m$ m dividing the Pel profile 34 up into sections, e.g., 64-Pel locations per section. For each section, a Pel location that contains a value of 00 in the Pel profile 34 is simply mapped to a value of 0 in the corresponding location of the source address list entry. Each jump in the Pel profile 34 is mapped to a value of 1 in the corresponding location of the source address list entry with exceptions noted below.

The first detected Pel location of the Pel profile 34 that encodes a jump in each section is also used to set the direction of the jump in the corresponding source address list entry. Recall that in the Pel profile 34, the direction of each jump is encoded with the jump. That is, each Pel location has a two-bit encoding where the value 11 encodes a jump up and 01 encodes a jump down. In the Bow profile of each source address list entry (bits 127:64), there is only one bit to encode whether to jump or not, so a single bit (bit 0) of the corresponding source address list entry encodes the initial direction of the jump. The software running on the microprocessor 18 determines the direction for bit 0 based upon the first detected jump within the Pel profile 34 that corresponds to the current source address list entry. For example, if the value of the first jump detected in a given section in the Pel profile 34 (corresponding to a given source address list entry) is "11" (a jump up), then bit 0 of that source address list entry is set to a value of 1 (direction=up). Similarly, if the value of the first jump detected in a given section in the Pel profile 34 is "01" (a jump down), then bit 0 of the source address list entry is set to a value of 0 (direction=down).

For each detected jump, there can be no jump on the next adjacent Pel location to the right thereof due to the imposed rule described above. As such, the location to the right of a valid jump is used as a lookahead feature to determine whether to change directions, or continue to jump in the current direction. For every jump detected, a decision is made how to encode the jump. If the jump in the Pel profile 34 (up or down) is in the same direction as the previous jump, the value 0 is written to the bow profile 35 immediately to the right of the valid jump. Thus the value 0 serves as a look ahead to indicate to the bow processor 20 that no change in jump direction is required. If the direction of the jump in the Pel profile 34 is different from the preceding jump, the value of 1 is recorded to the right of a valid jump and serves as a look ahead to indicate that a reversal of direction is required when the bow processor 20 performs the jump. After processing a jump in the Pel profile 34, the Pel location to the right thereof is skipped over because that corresponding location has already been allocated as the look ahead in the associated bow profile 35.

There is one exception to the above-described look ahead feature. If the last bit of the bow profile in the current source address list entry (e.g., bit 64 of a source address list entry)

is a jump, i.e., has the value 1, there would be no way for the bow processor 20 to know whether a change in direction is required, unless the bow processor 20 also loaded the next successive source address list entry. To prevent the bow processor 20 from having to load two 128 bit instructions just to look ahead for 1 bit of information, the next consecutive bit in the bow profile, which is encoded into bit 127 of the next source address list entry is designated herein as the $65^{th}$ bit (suggesting the $65^{th}$ bit in an instruction that otherwise only holds 64 bits of bow data) and is encoded at bit position 63 in the current source address list entry. For example, if the last bit of the bow profile in the current source address list entry (bit 64) is 1 and the first bit of the bow profile (bit 127) in the next source address list entry is also 1 indicating a change in direction, the microprocessor sets the $65^{th}$ bit (encoded at bit 63) of the current source address list entry to 1, otherwise, the $65^{th}$ bit (bit location 63 in the corresponding source address list entry) is set to 0. This allows the bow processor 20 to know that a direction change is required, even when processing the last bit of the bow profile encoded in the current source address list entry. The microprocessor 18 must also toggle the next bit of the bow profile, encoded as the first bit (bit 127) of the next source address list entry to 0. This prevents the bow processor 20 from performing a jump on the first bit (bit 127) of the next source address list entry if that value is set to 1 (indicating a shift in direction of a valid jump encoded to the left thereof) when the next source address list entry is loaded. The use of the $65^{th}$ bit (encoded into bit 63 of each source address list entry) is thus a look ahead into the next source address list entry.

Bits 24:16 of the Source Address List entry indicate an offset that is used to determine where the bow processor 20 is to read data from to begin the read/modify/write operations necessary to bow the image data. The offset is set at the highest row in which the bow processor 20 will place image data when processing the corresponding source address list entry. Conceptually, the microprocessor 18 determines the maximum Y offset in the Pel profile 34, determines the maximum offset in the section of the Pel profile being processed for the corresponding source address list entry and subtracts the two to derive the source address list entry offset.

As a simplified example, assume that each source address list entry includes only 22 bits to encode the bit profile so that the exemplary data in Table 2 corresponds to the Bow profile encoding of an entire source address list entry. The bow direction (bit 0 of the current source address list entry) is set to a value of 1 because the first detected jump when reading the values in Table 2 from left to right is a jump up (value=11). The offset is set to 1 because the highest row (determined by the data in columns 2 and 3) is one row from the top of Table 2. The 22-bit bow profile is encoded with 1-bit per Pel location as: "0010111010100101100001". Note that the last bit is a jump. Therefore, the direction is encoded into the $65^{th}$ bit (bit 63 of the corresponding source address list entry) as 1 indicating a change in direction. Note that the microprocessor 18 will also make sure that the first bit of the next bow profile (in the next source address list entry) is cleared as described above.

Having described the invention in detail and by reference to preferred embodiments thereof, it will be apparent that modifications and variations are possible without departing from the scope of the invention defined in the appended claims. For example, the present invention may also be integrated with a printhead or like device in a copier, facsimile machine, etc.

What is claimed is:

1. A method of electronically compensating for process direction position errors of a laser beam in an electrophotographic device comprising:
   reading a plurality of laser beam position measurements;
   constructing a laser beam scan path model from said laser beam position measurements that generally models a scan path of said laser;
   converting said laser beam scan path model into a Pel profile that characterizes process direction position errors of Pels written by said laser; and
   warping a bitmap image based upon said Pel profile prior to writing said bitmap image by said laser beam.

2. The method according to claim 1, wherein said laser beam scan path model is rotated so as to form a mirror image of said scan path of said laser beam.

3. The method according to claim 1, further comprising compensating said laser beam scan path model based upon registration data entered into said device.

4. The method according to claim 3, wherein said registration data comprises skew correction information and said laser beam scan path model is compensated for skew comprising:
   locating the position of the first writable Pel along said laser beam scan path model; and
   rotating said laser beam scan path model about said first writable Pel based upon said skew correction information.

5. The method according to claim 1, further comprising:
   converting said laser beam scan path model into a Pel model that corresponds Pel locations to associated locations of said scan path model, wherein said Pel profile is constructed from said Pel model.

6. The method according to claim 1, wherein said warping of said bitmap image data is performed by a bow processor in a controller of said electrophotographic device, and said warping of said bitmap image data based upon said Pel profile comprises converting said Pel profile into a bow profile, which translates said Pel profile into a format suitable for processing by said bow processor.

7. The method according to claim 1, wherein said plurality of laser beam position measurements comprise measurements taken at a plurality of test points.

8. The method according to claim 7, wherein said plurality of test points are read from a memory device on a printhead of said device.

9. The method according to claim 7, wherein each test point comprises a scan direction measurement, a process direction measurement, and a measurement corresponding to an angle of a rotating polygonal mirror in a corresponding printhead.

10. The method according to claim 9, wherein said scan direction measurements and said process direction measurements are taken relative to a predetermined, local coordinate system.

11. The method according to claim 10, wherein said laser beam scan path model is constructed by converting for each test point, the corresponding measurement in said scan direction and the corresponding measurement in said process direction, to a coordinate system taken with respect to a known point on a printhead of said device.

12. A method of electronically compensating for process direction position errors of a laser beam in an electrophotographic device comprising:
   constructing a Pel profile that characterizes process direction position errors of Pels written by said laser; and warping a bitmap image based upon said Pel profile prior to writing said bitmap image by said laser beam, wherein said Pel profile is constructed by:
  constructing a model of a scan path of said laser beam;
  dividing said model into a plurality of Pel locations; and
  determining for each Pel location, a corresponding offset in a process direction which is transverse to a scan direction of said laser beam, based upon said model.

13. The method according to claim 12, wherein each Pel location is encoded using at least two bits that define whether that Pel location defines a jump up, a jump down, or no jump.

14. The method according to claim 13, wherein each jump comprises one Pel in said process direction.

15. The method according to claim 12, wherein said offset for each Pel location is determined comprising:
  dividing said model into a plurality of sections, each section comprising a plurality of Pel locations including a start Pel location which is the first Pel location in a corresponding one of said sections, and a stop Pel location which is the last Pel location in said corresponding one of said sections, and for each section:
  determining a number of Pel locations in said section;
  determining a process direction offset for each of said start and stop Pel locations;
  determining a number of Pel jumps between said process direction offsets of said start Pel location and said stop Pel location; and
  distributing said number of Pel jumps across said Pel locations in said section.

16. The method according to claim 15, wherein the process direction offset of each Pel location is encoded into a bit profile that encodes each Pel location process direction offset as a function of the process direction offset of an adjacent Pel location.

17. The method according to claim 16, wherein each process direction offset is encoded to represent a select one of no change in process direction position from an adjacent Pel location, a jump up one Pel location in the process direction relative to said adjacent Pel, or a jump down one Pel location in the process direction relative to said adjacent Pel.

18. The method according to claim 15, wherein said number of Pel jumps are distributed generally evenly across said section.

19. A method of electronically compensating for process direction position errors of a laser beam in a color electrophotographic device comprising:
  constructing a Pel profile that characterizes process direction position errors of Pels written by a corresponding laser for each of four color image planes; and
  warping an image by:
    deconstructing said image into four bitmaps, each bitmap corresponding to a select one of said four color image planes; and
    warping each bitmap based upon a corresponding one of said Pel profiles prior to writing said bitmap by said corresponding laser beam, wherein each Pel profile is constructed by:
      constructing a model of a scan path of said corresponding laser beam;
      dividing said model into a plurality of Pel locations; and
      determining for each Pel location, a corresponding offset in a process direction which is transverse to a scan direction of said laser beam, based upon said model.

* * * * *